United States Patent
Tillotson

(10) Patent No.: US 10,908,618 B2
(45) Date of Patent: Feb. 2, 2021

(54) ROTOR CONTROL LAW FOR MULTI-ROTOR VEHICLES SYSTEMS AND METHODS

(71) Applicant: The Boeing Company, Chicago, IL (US)

(72) Inventor: Brian J. Tillotson, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 74 days.

(21) Appl. No.: 16/188,938

(22) Filed: Nov. 13, 2018

(65) Prior Publication Data
US 2020/0073410 A1  Mar. 5, 2020

Related U.S. Application Data

(60) Provisional application No. 62/726,003, filed on Aug. 31, 2018.

(51) Int. Cl.
| G05D 1/08 | (2006.01) |
|---|---|
| G05D 1/00 | (2006.01) |
| B64D 31/06 | (2006.01) |
| B64C 27/00 | (2006.01) |
| G06K 9/00 | (2006.01) |
| G08G 5/04 | (2006.01) |
| H02P 5/56 | (2016.01) |
| G06T 7/62 | (2017.01) |

(Continued)

(52) U.S. Cl.
CPC ......... G05D 1/0816 (2013.01); B64C 27/006 (2013.01); B64D 31/06 (2013.01); G05D 1/0055 (2013.01); G06K 9/0063 (2013.01); G08G 5/045 (2013.01); B64C 39/024 (2013.01); B64C 2201/024 (2013.01); B64C 2201/14 (2013.01); G05D 1/0066 (2013.01); G06T 7/20 (2013.01); G06T 7/62 (2017.01); G06T 2207/10016 (2013.01); G06T 2207/10028 (2013.01); G06T 2207/10044 (2013.01); G06T 2207/30241 (2013.01); G06T 2207/30261 (2013.01); H02P 5/56 (2016.02)

(58) Field of Classification Search
CPC ... G05D 1/0816; G05D 1/0055; G05D 1/0066
See application file for complete search history.

(56) References Cited

U.S. PATENT DOCUMENTS

| 7,598,888 B2 | 10/2009 | Matuska et al. |
|---|---|---|
| 9,047,675 B2 | 6/2015 | Tillotson |

(Continued)

OTHER PUBLICATIONS

Verbeke et al., "Vibration analysis of a UAV multirotor frame", Sep. 2016, 10 pages, Oostende, Belgium.

*Primary Examiner* — Todd Melton
(74) *Attorney, Agent, or Firm* — Haynes and Boone, LLP

(57) ABSTRACT

Methods and systems according to one or more examples are provided for controlling a multi-rotor vehicle. In one example, a multi-rotor vehicle comprises an airframe and a plurality of rotors coupled to the airframe. The multi-rotor vehicle further comprises a controller, coupled to the airframe, configured to determine a rotational speed of each of the plurality of rotors, and adjust the rotational speed of each of the plurality of rotors such that the rotors do not dwell within a no-dwell zone comprising rotational speeds associated with one or more frequency aspects of the airframe.

40 Claims, 13 Drawing Sheets

(51) Int. Cl.
   *B64C 39/02* (2006.01)
   *G06T 7/20* (2017.01)

(56) References Cited

U.S. PATENT DOCUMENTS

2015/0379876 A1    12/2015  Navot et al.
2019/0185149 A1*    6/2019  Pantalone .......... G10K 11/1785

* cited by examiner

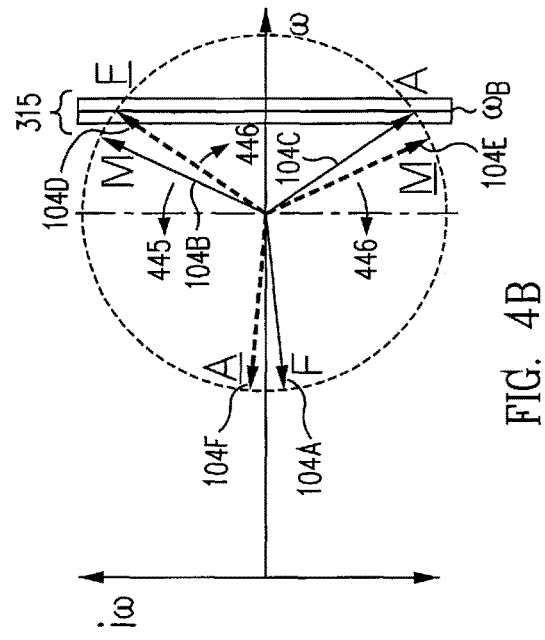
FIG. 4A
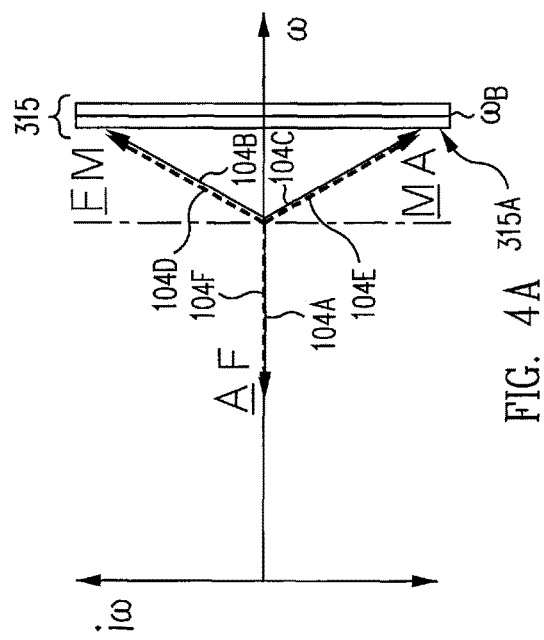
FIG. 4B
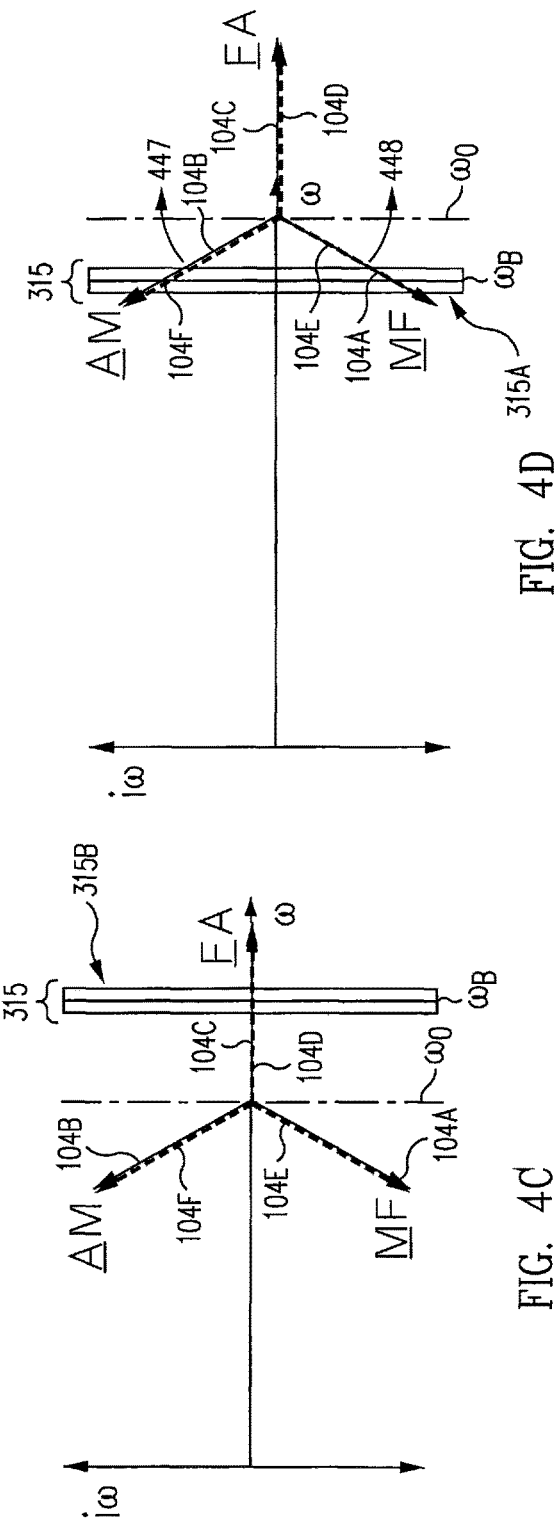
FIG. 4C
FIG. 4D

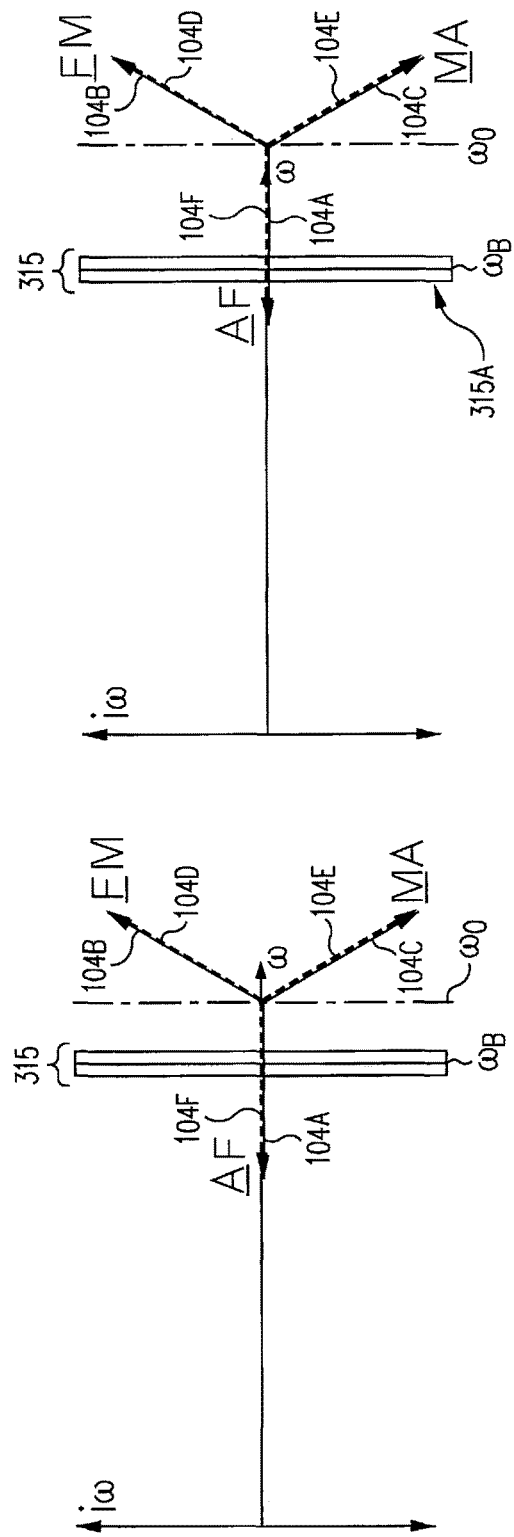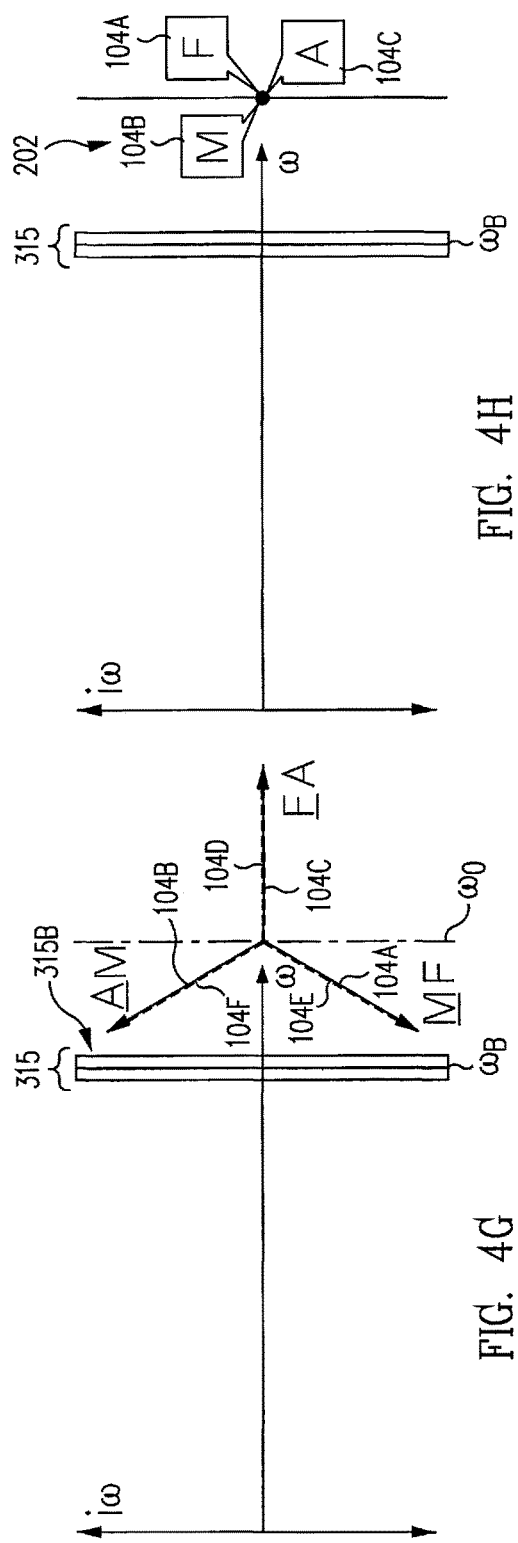

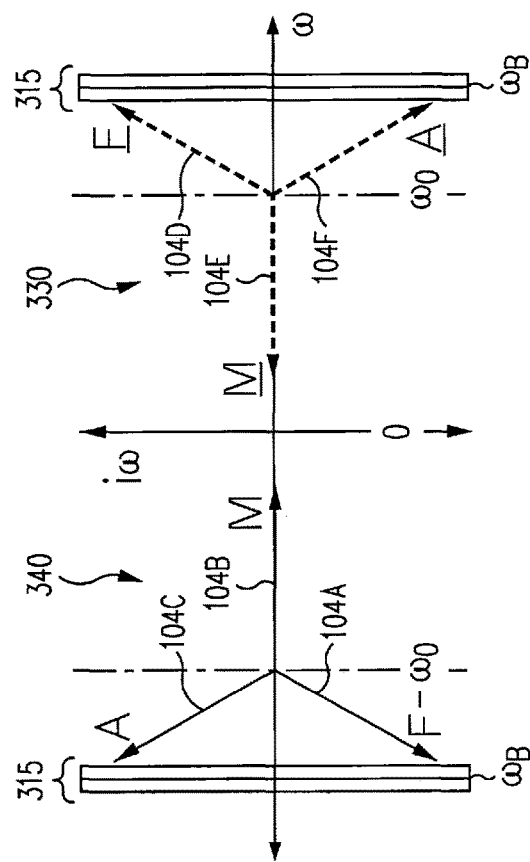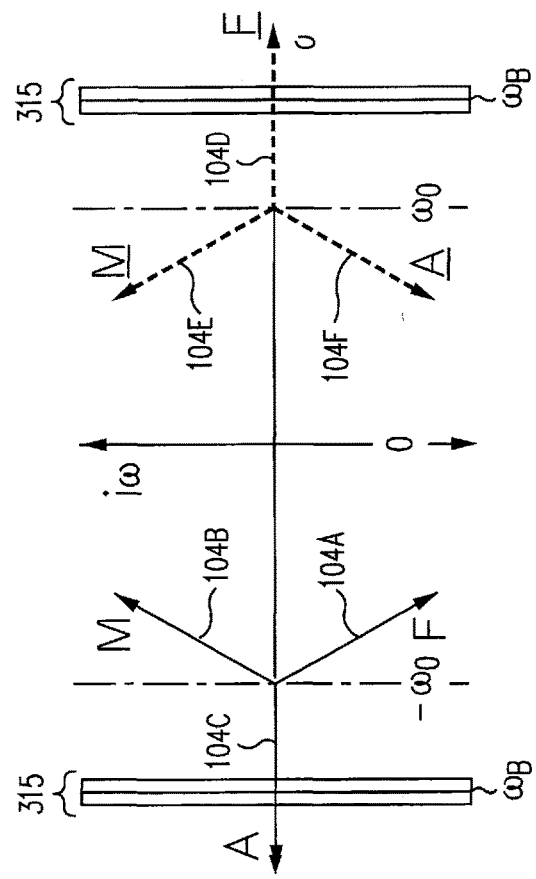
FIG. 5A
FIG. 5B

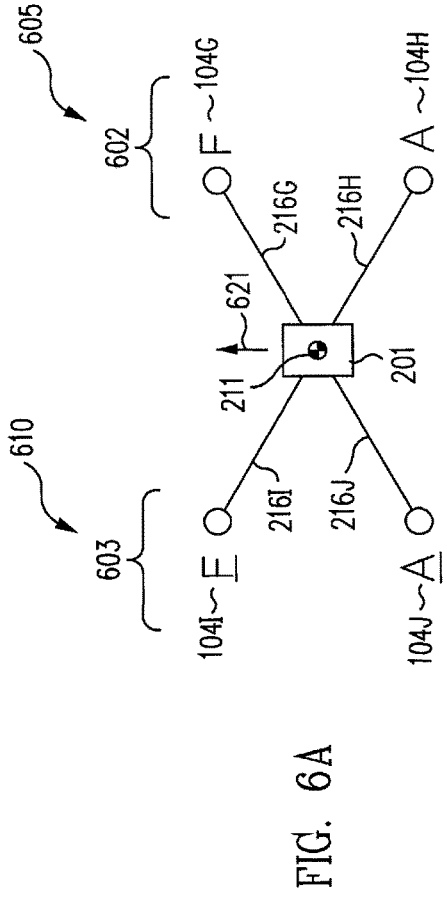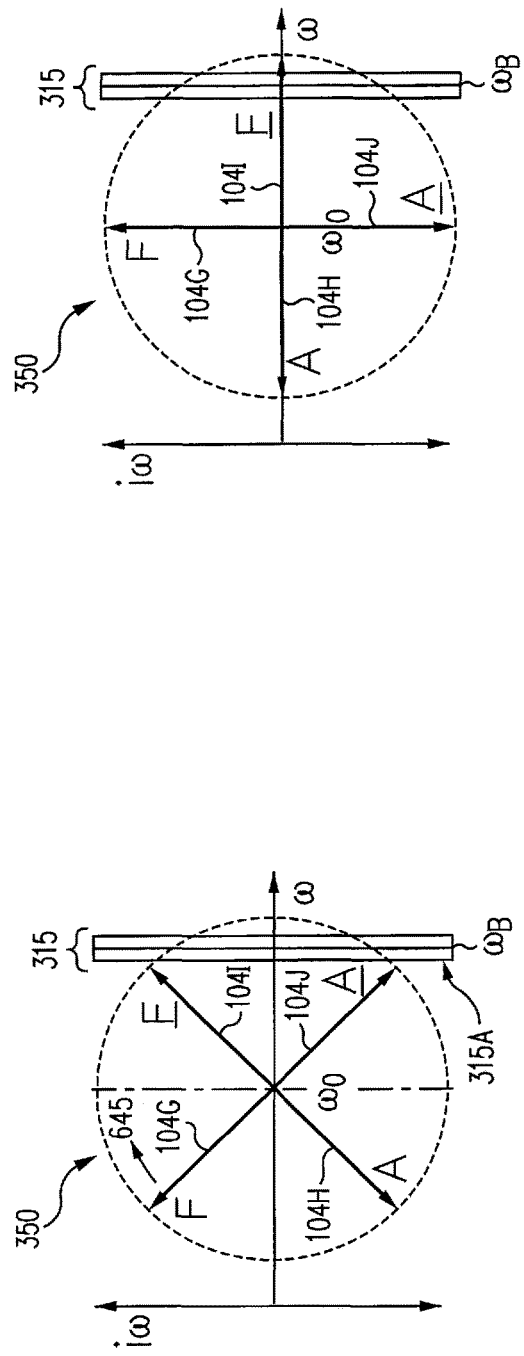
FIG. 6A
FIG. 6B
FIG. 6C

ROTOR CONTROL LAW FOR MULTI-ROTOR VEHICLES SYSTEMS AND METHODS

CROSS REFERENCE TO RELATED APPLICATIONS

This application claims the benefit of and priority to U.S. Provisional Patent Application No. 62/726,003 filed Aug. 31, 2018 and entitled "SYSTEMS AND METHODS FOR OPERATING MULTI-ROTOR VEHICLES" which is incorporated herein by reference in its entirety.

TECHNICAL FIELD

The present disclosure relates generally to multi-rotor vehicles, and more specifically to improved techniques for control of multi-rotor vehicles.

BACKGROUND

Multi-rotor vehicles are becoming increasingly popular for use as drones to provide surveillance, cargo vehicles for delivery of packages, and air vehicles to carry passengers, for example. As interest grows, advanced multi-rotor vehicles are becoming smaller and more economical to produce and use.

However, there is a need to achieve a controlled level of flight over a range of speeds with safe, rapid transitions to maintain vehicle performance.

SUMMARY

Methods and systems are disclosed herein that provide improved techniques for achieving a controlled level of flight of a multi-rotor vehicle while minimizing a dwell time in a keep-out band of rotational speeds. In some examples, a multi-rotor vehicle, such as a multi-rotor rotorcraft (e.g., a vehicle) may have at least two rotors and typically includes between three and twelve rotors. The rotors provide lift to the vehicle, used for take-off and landing. One or more sensors are located on the vehicle to provide information for each of the rotors rotational speeds. A controller processes the sensor information to determine if one or more rotors are approaching a rotational speed within a keep-out zone of rotational speeds, for example, when the vehicle is increasing speed after take-off or when the vehicle is decreasing speed during a landing maneuver. The controller may adjust a rotational speed of each of the rotors to minimize a dwell time within the keep-out zone of rotor speeds, and maintain controlled level flight of the vehicle.

In one example, a multi-rotor vehicle includes an airframe; a plurality of rotors coupled to the airframe; and a controller, coupled to the airframe, configured to: determine a rotational speed of each of the plurality of rotors; and adjust the rotational speed of each of the plurality of rotors such that the rotors do not dwell within a no-dwell zone comprising rotational speeds associated with one or more frequency aspects of the airframe.

In another example, a method includes determining a rotational speed of each of a plurality of rotors coupled to an airframe of a multi-rotor vehicle; and adjusting the rotational speed of each of the plurality of rotors such that the rotors do not dwell within a no-dwell zone comprising rotational speeds associated with one or more frequency aspects of the airframe.

In another example, a multi-rotor vehicle includes an airframe; a plurality of rotors coupled to the airframe; one or more control surfaces coupled to the airframe; and a controller, coupled to the airframe, configured to: determine a rotational speed of each of the plurality of rotors; adjust the rotational speed of each of the plurality of rotors such that the rotors do not dwell within a no-dwell zone comprising rotational speeds associated with one or more frequency aspects of the airframe; and adjust the one or more control surfaces to maintain controlled flight of the multi-rotor vehicle.

In another example, a method includes determining a rotational speed of each of a plurality of rotors coupled to an airframe of a multi-rotor vehicle; adjusting the rotational speed of each of the plurality of rotors such that the rotors do not dwell within a no-dwell zone comprising rotational speeds associated with one or more frequency aspects of the airframe; and adjusting one or more control surfaces, coupled to the airframe, to maintain controlled flight of the multi-rotor vehicle.

In another example, a method of determining a plurality of rotational speed zones for a plurality of rotors coupled to an airframe of a multi-rotor vehicle includes determining a plurality of rotational speeds associated with one or more frequency aspects of the airframe; determining a first zone of rotational speeds associated with frequencies less than the one or more frequency aspects of the airframe; determining a transitional zone of rotational speeds associated with frequencies substantially equivalent to the one or more frequency aspects of the airframe; and determining a second zone of rotational speeds associated with frequencies greater than the one or more frequency aspects of the airframe.

The scope of the disclosure is defined by the claims, which are incorporated into this section by reference. A more complete understanding of examples of the disclosure will be afforded to those skilled in the art, as well as a realization of additional advantages thereof, by a consideration of the following detailed description of one or more examples. Reference will be made to the appended sheets of drawings that will first be described briefly.

BRIEF DESCRIPTION OF THE DRAWINGS

FIGS. 4A to 4H illustrate diagrams of a trefoil configuration of a six rotor multi-rotor vehicle in accordance with examples of the disclosure.

FIGS. 5A and 5B illustrate diagrams of a multi-rotor vehicle including rotors rotating in opposite directions in accordance with examples of the disclosure.

FIGS. 6A to 6C illustrate diagrams of a four rotor multi-rotor vehicle under control laws in stable level flight in accordance with examples of the disclosure.

Examples of the present disclosure and their advantages are best understood by referring to the detailed description that follows. It should be appreciated that like reference numerals are used to identify like elements illustrated in one or more of the figures.

DETAILED DESCRIPTION

Figure 1A:
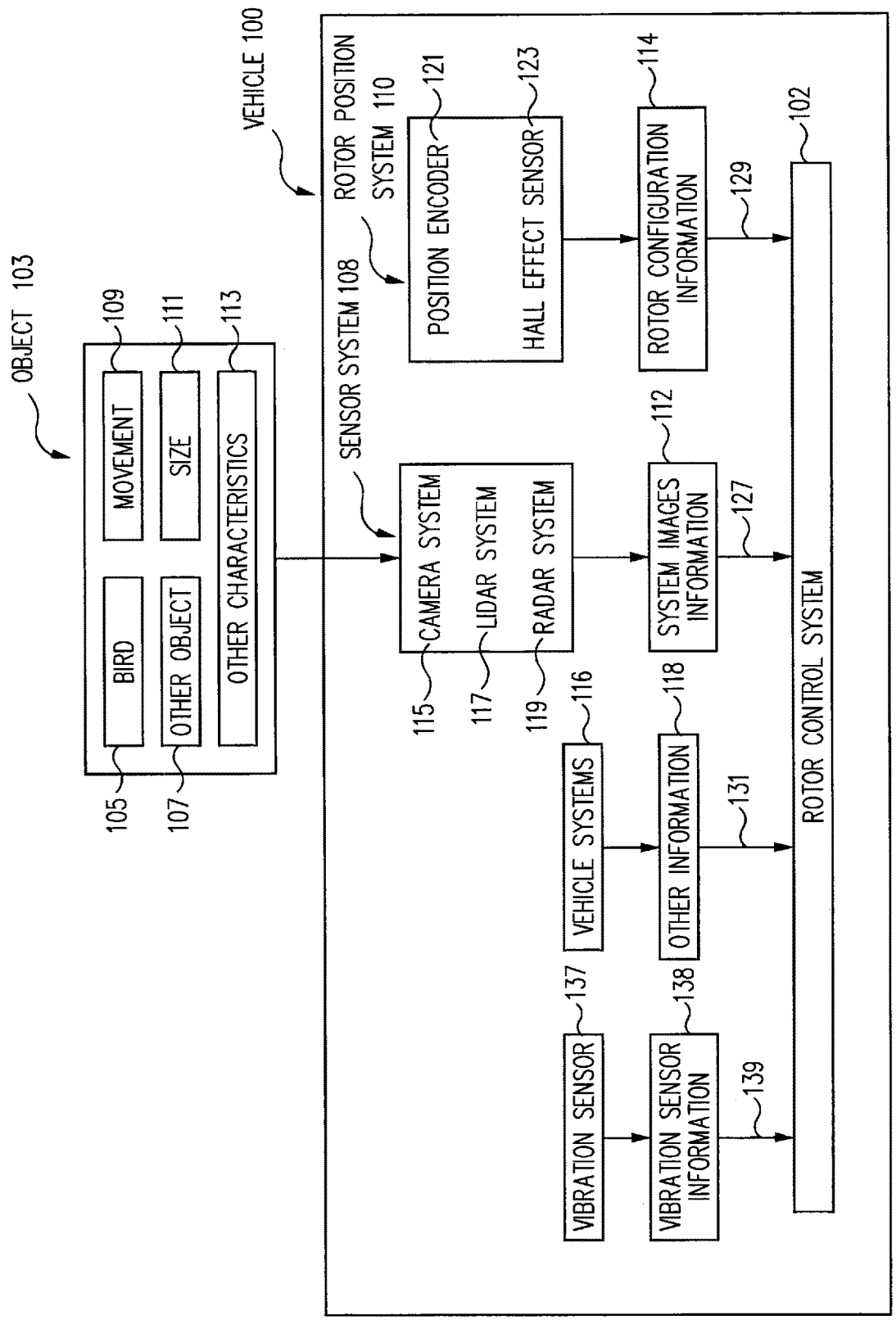
FIGS. 1A and 1B illustrate diagrams of a multi-rotor vehicle including a rotor control system in accordance with examples of the disclosure.

Various examples of the present disclosure provide for improved techniques for quickly transitioning a keep-out band of rotational speeds while at the same time achieving a controlled level of flight of a multi-rotor vehicle. Multi-rotor vehicles that may be operationally affected by frequency aspects of an airframe of the vehicle, and are not limited to, multi-rotor vertical take-off and landing (VTOL) vehicles. To avoid unwanted structural resonance or other disruptive vibrational characteristics, designers of multi-rotor vehicles have identified keep-out bands of rotational speeds of rotors to minimize the effects of such disturbances.

Multi-rotor VTOL vehicles generally have relatively small rotors that are relied on for lift and maneuverability. Multi-rotor VTOL vehicles generally have at least two rotors, and may include up to twelve rotors, for example, arranged as symmetrically opposite rotor pairs relative to a center of gravity of the airframe of the vehicle. It will be noted that for systems and methods described herein, a greater number of rotors are possible in some examples.

To maintain performance of such vehicles, a keep-out zone of rotor speeds associated with one or more frequency aspects of the vehicle may be imposed to prevent rotors from dwelling in rotor speed zones that may cause performance degradation associated with one or more frequency aspects, for example, a structural resonance of the vehicle.

Some approaches to avoiding structural resonance may be to operate the vehicle at a lower airspeed to avoid running the rotors within the keep-out zone or to incorporate a rotor with a larger diameter rotor blade allowing the rotor to provide the same lift at a lower speed. Another approach may be to stiffen the vehicle airframe to move the resonance to a higher frequency and allow the rotor to operate at a higher speed. Typically, these approaches may affect mobility of the vehicle or add extra weight that affect vehicle performance.

Attempts have been made to alter control laws such that rotors do not operate at speeds near the rotor speed keep-out zone resulting in a notch in the flight control laws. However, it may be difficult to create such control laws and maintain controlled flight.

Each rotor includes a motor to drive the rotor and an associated controller to control the speed of each rotor. The vehicle may also have an identified rotor speed, $\omega_B$, associated with a resonance of the vehicle and a keep-out band of rotor speeds may be imposed around rotor speed $\omega_B$. The keep-out band of speeds is generally determined to be slightly less than and slightly greater than $\omega_B$.

An illustrative example of transitioning a keep-out band of rotational speeds while at the same time achieving a controlled level of flight will be briefly described. A first act is take-off of the vehicle when speeds of the rotor pairs are well clear of the lower side of $\omega_B$. Rotor speeds are adjusted based on two groups of three rotors and rotor speeds are increased until the two fastest rotor pairs are close to the lower side of $\omega_B$. A second act is a first jump when the speed of one rotor pair goes above the upper side of $\omega_B$. Thereafter, a speed is increased until the two slowest rotor pairs are close to the lower side of $\omega_B$. A third act is a second jump when the speed of another rotor pair goes above the upper side of $\omega_B$. Thereafter, a speed is increased until the slowest rotor pair is close to the lower side of $\omega_B$. A fourth act is a third jump when the speed of the slowest rotor goes above the upper side of $\omega_B$. At high-speed flight, speeds of the rotor pairs are well clear of the upper side of $\omega_B$. A vehicle landing is performed in a similar manner with speeds decreasing through the keep-out band of rotor speeds.

A further illustrative example provides a system and method for detecting an object proximate a rotor of the vehicle using sensors included on the vehicle. A trajectory of the object may be calculated, and a determination made whether the object intersects a rotor if the vehicle continues on its current flight path. In some examples, the vehicle may adjust a rotational speed of one or more rotors, as described herein, to avoid the object strike.

Figure 1B:
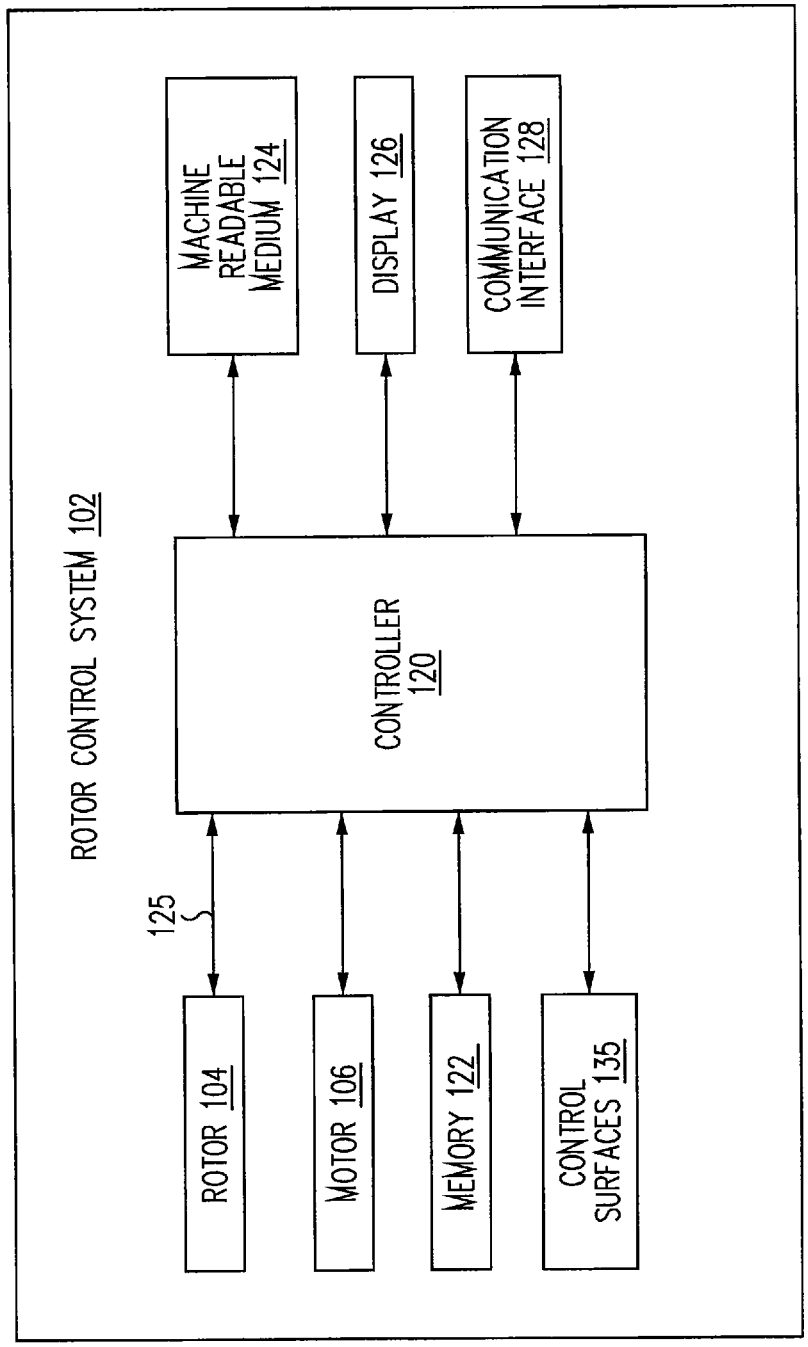

FIGS. 1A and 1B illustrate block diagrams of a multi-rotor vehicle 100 including a rotor control system 102 in accordance with an example of the disclosure. Multi-rotor vehicle 100 may be implemented as any moving multi-rotor vehicle configured to travel over land, water or air. In one non-limiting example, multi-rotor vehicle 100 may be an aircraft configured as a multi-rotor aircraft. In another non-limiting example, multi-rotor vehicle 100 may be a lighter than air multi-rotor aircraft. In various non-limiting examples, multi-rotor vehicle 100 may be configured as a multi-rotor electric vertical take-off and landing (VTOL) vehicle. Multi-rotor vehicle 100 may be manned or unmanned. Multi-rotor vehicle 100 may be operated by any operator, either positioned within multi-rotor vehicle 100 or operated remotely by wireless or wired communication and control.

Multi-rotor vehicle 100 includes rotor control system 102. In one non-limiting example, rotor control system 102 is configured to adjust a rotational speed of one or more rotors 104 while maintaining stable, level flight. In another non-limiting example, rotor control system 102 is configured to detect an object 103 and minimize damage to the multi-rotor vehicle 100 in the event of an imminent, unavoidable strike by object 103 on multi-rotor vehicle 100 while maintaining stable, level flight.

In one example, rotor control system 102 is implemented in software running on a dedicated processing system, in hardware, or a combination of hardware and software. In various examples, multi-rotor vehicle 100 is configured to receive sensor information from a rotor position system 110 (e.g., a first sensor) and a sensor system 108 (e.g., imaging sensor), both coupled to an airframe of multi-rotor vehicle 100 (e.g., such as airframe 201 of FIG. 2), and provide control signals to rotor control system 102 of multi-rotor vehicle 100.

In one example, various components of rotor control system 102 are implemented remote from multi-rotor vehicle 100. The remote components communicate with multi-rotor vehicle 100 and/or rotor control system 102 through a wired or wireless communication interface.

Object 103 may be any object that is proximate the multi-rotor vehicle 100. For example, object 103 may be an object moving in a direction along a path that intersects multi-rotor vehicle 100 if it continues on its current trajectory. Object 103 may be in the air or object 103 may be on the ground. Object 103 may be a bird 105 or other object 107. For example, in one example, other object 107 may another vehicle, such as an unmanned aerial vehicle (UAV). In other examples, other object 107 may a projectile either natural or man-made (e.g., such as a missile). Other non-limiting examples of object 103 are possible.

In one example, rotor control system 102 may be configured to identify movement 109, size 111, and/or other characteristics 113 of object 103. In one non-limiting example, rotor control system 102 is configured to use movement 109 and size 111 of object 103 to calculate a probability of object 103 striking the multi-rotor vehicle 100. Rotor control system 102 may use movement 109 and size 111 of object 103 to aid in calculating a location that object 103 may strike multi-rotor vehicle 100 and/or a rotor 104 of multi-rotor vehicle 100. In various examples, rotor control system 102 is configured to use movement 109, size 111, and other characteristics 113 of object 103 to identify and/or determine other characteristics of object 103 that may strike multi-rotor vehicle 100.

Sensor system 108 may include one or more sensors configured to capture one or more images of object 103. For example, sensor system 108 (e.g., third sensor and/or imaging sensor) may include one or more sensors mounted to a front of multi-rotor vehicle 100 in a position and/or an orientation configured to capture a plurality of images of the object 103 that is proximate the multi-rotor vehicle 100. Sensors of sensor system 108 may be mounted facing in a direction that multi-rotor vehicle 100 is traveling to view object 103 in the path of multi-rotor vehicle 100. In one example, one or more different types of sensors of sensor system 108 are mounted to the multi-rotor vehicle 100. In this regard, in various examples, sensor system 108 includes at least one of a video imaging camera system 115 (e.g., one or more cameras), a lidar imaging sensor 117, and/or a radar imaging sensor system 119, each configured to capture a plurality of images of object 103 and provide sensor information (e.g., third sensor information) to rotor control system 102. In various examples, rotor control system 102 receives the plurality of images comprising sensor information and processes the sensor information to detect object 103. In addition, in various examples, rotor control system 102 calculates a trajectory of object 103 with respect to the multi-rotor vehicle 100 from sensor information received from sensor system 108.

In one illustrative example, rotor control system 102 is configured to receive system images information 112 (e.g., image information or images of object 103) from sensor system 108. In this regard, without limitation, rotor control system 102 receives system images information 112 from sensor system 108 at a sensor system signal interface 127. In various examples, system images information 112 includes a series of images of object 103 moving along a path that is proximate to multi-rotor vehicle 100. Other examples are possible, such as system images information 112 including images of object 103 that is stationary while multi-rotor vehicle 100 is moving along a path that is proximate to object 103. Further descriptions of detecting objects with respect to the vehicle may be found in U.S. Pat. No. 9,047,675 issued Jun. 2, 2015, which is incorporated herein by reference in its entirety.

In one illustrative example, rotor control system 102 is configured to receive rotor position information from rotor position system 110 of multi-rotor vehicle 100. In this regard, in one example, rotor control system 102 is configured to receive rotor configuration information 114 for rotor 104 of multi-rotor vehicle 100 from rotor position system 110 at a rotor position system signal interface 129. In various examples, rotor control system 102 is configured to use rotor configuration information 114 to determine a rotational speed of rotor 104. In some non-limiting examples, rotor configuration information 114 (e.g., first sensor information) includes rotational speed information of one or more of the rotors 104.

In various examples, rotor position system 110 includes a rotor position encoder 121 and/or a Hall Effect sensor 123, each configured to provide rotor configuration information 114 (e.g., rotational speed information) to rotor control system 102. In one example, rotor position encoder 121 is configured as a measuring device used to convert angular position of rotor 104 to an analog or digital signal provided as rotor configuration information 114. In another example, rotor position encoder 121 is configured as a video imaging camera and/or lidar imaging sensor used to provide captured images of rotor 104 as rotor configuration information 114. It will be appreciated that other non-limiting types of rotor position encoder 121 measuring devices are possible in other examples.

In various examples, other information 118 is provided by vehicle systems 116. Rotor control system 102 is configured to receive other information 118 from vehicle systems 116 via a vehicle systems signal interface 131. In one non-limiting example, other information 118 provides a current location of multi-rotor vehicle 100, a current speed and direction of travel of multi-rotor vehicle 100, and other information or combination of information appropriate for use by rotor control system 102 to determine a location of multi-rotor vehicle 100. In some examples, vehicle systems 116 includes a navigation system such as an inertial navigation system, a satellite-based navigation system, or other systems or devices on multi-rotor vehicle 100 to provide other information 118, such as a geolocation of multi-rotor vehicle 100.

In various examples, multi-rotor vehicle 100 includes a vibration sensor 137 (e.g., a second sensor) coupled to airframe 201. In one non-limiting example, vibration sensor 137 measures a vibration of the airframe 201 at one or more locations of multi-rotor vehicle 100, and provides vibration sensor information 138, appropriate for use by rotor control system 102 to determine a vibration of airframe 201 and/or multi-rotor vehicle 100. In some examples, vibration sensor 137 may include a piezoelectric sensor, or any other type of sensor used to provide vibration sensor information 138.

In one illustrative example, rotor control system 102 is configured to provide control signals 125 to control one or more of the rotors 104 of multi-rotor vehicle 100. In this regard, without limitation, rotor control system 102 processes the system images information 112 from sensor system 108 and/or rotor configuration information 114 from rotor position system 110 and uses the processed system images information 112 and rotor configuration information 114 to selectively control rotor 104 of multi-rotor vehicle 100. In some non-limiting examples, rotor control system 102, through control signals 125, causes rotor 104 to speed up or to slow. In response, multi-rotor vehicle 100 may change a flight profile to climb, descend, turn, and/or roll to avoid contact with object 103, or to reduce damage to the multi-rotor vehicle 100 if a strike by object 103 is imminent.

In other non-limiting examples, rotor control system 102, through control signals 125, causes rotor 104 to change a rotational speed, a phase, and/or a pitch of a rotor blade (e.g., not shown) of rotor 104 to avoid contact with object 103, or if contact is unavoidable, to reduce damage to the rotor. In another non-limiting example, rotor control system 102, through control signals 125, causes rotor 104 to change a rotational speed of at least one of a plurality of rotors 104 such that any one of rotors 104 do not dwell within a no-dwell zone of rotational speeds, and to minimize damage to rotor 104 by the object.

FIG. 1B illustrates a block diagram of rotor control system 102 of FIG. 1A in accordance with an example of the disclosure. As shown in FIG. 1B, rotor control system 102 includes a controller 120, a memory 122, a machine readable medium 124, a display 126, and a communication interface 128 which may be implemented within multi-rotor vehicle 100. In some examples, one or more parts of rotor control system 102 may be located remote from multi-rotor vehicle 100. In this example, rotor control system 102 is coupled to airframe 201 of multi-rotor vehicle 100, and receives and processes the system images information 112 and/or rotor configuration information 114, and provides control signals 125 to one or more of the rotors 104 to control a rotational speed and/or a phase of the one or more rotor 104. In various examples, rotor 104 includes a motor 106, and controller 120 provides control signals 125 to one or more of motor 106 to control a rotational speed and/or a phase of the one or more rotor 104.

Controller 120 may include, for example, a microprocessor, a single-core processor, a multi-core processor, a microcontroller, an application-specific integrated circuit (ASIC), a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory to execute instructions to perform any of the various operations described herein.

In various examples, it should be appreciated that processing operations and/or instructions are integrated in software and/or hardware as part of controller 120, or code (e.g., software or configuration data) which is stored in memory 122. Examples of processing operations and/or instructions disclosed herein are stored by a machine readable medium 124 in a non-transitory manner (e.g., a memory, a hard drive, a compact disk, a digital video disk, or a flash memory) to be executed by a computer (e.g., logic or processor-based system) to perform various methods disclosed herein.

In various examples, controller 120 receives one or more frequency aspects of airframe 201 (e.g., airframe 201 of FIG. 2) that includes one or more resonance frequencies of airframe 201 and a physical configuration of the airframe 201, and calculates a no-dwell zone of rotational speeds. No-dwell zone provides controller 120 with a range of rotational speeds such that the rotational speed of rotor 104 does not dwell within the no-dwell zone associated with the one or more frequency aspects of airframe 201.

For example, controller 120 is configured to receive rotor configuration information 114 to determine the rotational speed of each of a plurality of rotors 104. Controller 120 adjusts the rotational speed of each of the plurality of rotors 104 such that each rotor 104 does not dwell within the no-dwell zone comprising rotational speeds associated with the one or more frequency aspects of airframe 201 based on rotor configuration information 114.

In various examples, controller 120 receives and is configured to monitor the vibration sensor information 138 (e.g., second sensor information). Controller 120 processes the vibration sensor information 138 and adjusts a rotational speed of each of the plurality of rotors 104 such that rotors 104 do not dwell within the no-dwell zone based on vibration sensor information 138.

In some examples, controller 120 adjusts control surfaces 135. In this regard, one or more control surfaces 135 are adjusted to control a pitch, a yaw, and/or a roll of multi-rotor vehicle 100, to substantially maintain controlled flight of multi-rotor vehicle 100. In various examples, control surfaces include an elevator, or a thrust-vector vane coupled to at least one of more of the rotors 104. Other types of control surfaces are possible to control a pitch, yaw and/or roll of multi-rotor vehicle 100 in other examples.

Memory 122 includes one or more memory devices (e.g., one or more memories) to store data and information. The one or more memory devices include various types of memory including volatile and non-volatile memory devices, such as RAM (Random Access Memory), ROM (Read-Only Memory), EEPROM (Electrically-Erasable Read-Only Memory), flash memory, or other types of memory. In one example, controller 120 is adapted to execute software stored in memory 122 to perform various methods, processes, and operations in a manner as described herein. In some examples, memory 122 is coupled to airframe 201, and stores the no-dwell zone information provided by controller 120.

Display 126 includes, in one example, a display device (e.g., a liquid crystal display (LCD)) or various other types of generally known video displays, monitors, and/or gauges for use with multi-rotor vehicle 100. Controller 120 may be adapted to display system images information 112, rotor configuration information 114, and other information 118 on display 126. Controller 120 may be adapted to retrieve system images information 112, rotor configuration information 114, and other information 118 from memory 122 and display any retrieved system images and/or information on display 126. Display 126 may include display electronics, which may be utilized by controller 120 to display system images and sensor information. Display 126 may receive the system images and sensor information directly from one or more sensors of multi-rotor vehicle 100 via controller 120, or the system images and sensor information may be transferred from memory 122 via controller 120. Furthermore, controller 120 may be adapted to be integrated as part of display 126 to operate as both a user input device and a display device, such as, for example, a touch screen device adapted to receive input signals from a user touching different parts of the display screen.

Controller 120 is adapted to interface and communicate with sensor system 108, rotor position system 110, rotor control system 102, vehicle systems 116, and/or display 126 via a communication interface 128 to perform method and processing steps as described herein. Communication interface 128 includes wired or wireless communication buses within multi-rotor vehicle 100. Communication interface 128 may be implemented as a wireless communication interface and may include, for example, Wi-Fi, Bluetooth, Zigbee, and/or other radio wave or optical interfaces.

In some examples, geometric and mechanical calculations for control of rotor control system 102 are performed off-line, with results stored in lookup tables or other data structures within memory 122. Off-line calculations allow multi-rotor vehicle 100 to use fewer processing resources during operations and/or reduce computation time necessary to perform operations of rotor control system 102. Off-line calculations may include calculations for computation of acceptable changes in the rotation rate of rotors to avoid the no-dwell zone, computation in rotation rates of one or more unaffected rotors to maintain an attitude and/or a rate of ascent or descent of multi-rotor vehicle 100, and estimate a trajectory and/or current path of object 103.

Figure 2:
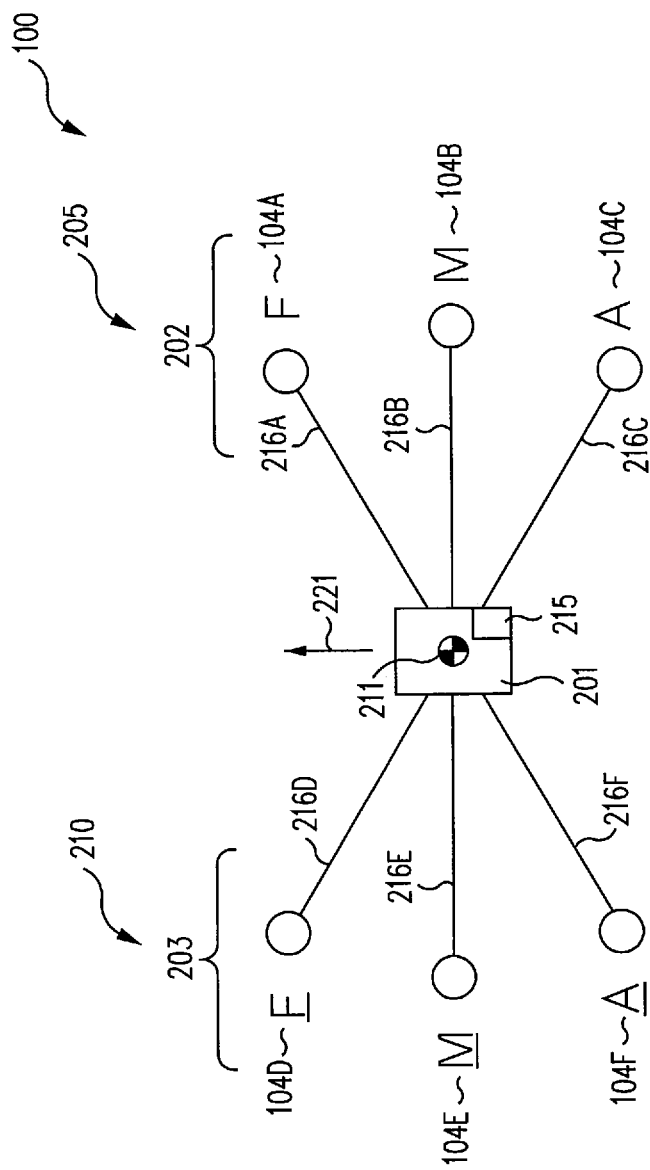
FIG. 2 illustrates a top view of a six-rotor multi-rotor vehicle in accordance with an example of the disclosure.

Aspect of controlling the multi-rotor vehicle 100 is shown in FIG. 2. In some examples, multi-rotor vehicle 100 includes six rotors 104A-104F grouped in pairs on opposite sides relative to a center of gravity 211 of the airframe 201. If both rotors 104 in a pair, such as rotor 104A and rotor 104F, for example, generate approximately the same thrust, their net torque around center of gravity 211 of multi-rotor vehicle 100 is zero. If rotor 104A, for example, of rotor 104A and rotor 104F pair fails in flight, controller 120 provides commands to rotor 104F to stop rotating, to minimize a torque disturbance. Flight of multi-rotor vehicle 100 continues using the remaining two pairs of rotors 104. Thus, rotors 104 are generally sized so that any two pair of rotors 104 can maintain safe, level flight.

In some examples, multi-rotor vehicle 100 power includes a power system 215 implemented as one or more batteries. Output power of power system 215 is limited. Power system 215 with a high-power capacity is more expensive and heavier than power system 215 with a low power capacity. In this regard, it is desirable to operate multi-rotor vehicle 100 a low power capacity power system 215 and still maintain system performance.

Increasing the rotational speed of a rotor 104 increases its kinetic energy. The kinetic energy comes from power system 215, so the total rate of increase for the rotors 104 cannot exceed the maximum power capacity of power system 215. The kinetic energy of a rotor 104 is proportional to the square of the rotational speed, ω. To a first order, the thrust of a fixed-pitch rotor is also proportional to the square of ω. Changing the rotational speed of a vertical-axis rotor, such as, for example, rotor 104, causes multi-rotor vehicle 100 to yaw. For straight and level flight, it is desirable to increase or decrease rotational speed of rotor 104 without affecting the yaw. Speeds of several rotors 104 are maintained approximately equal to keep the overall angular momentum in the rotors 104 from changing.

As illustrated in FIG. 2, in one example, multi-rotor vehicle 100 includes a right-hand rotor set 202 (e.g., a first group) at a starboard side 205, and a left-hand rotor set 203 (e.g., a second group) at a port side 210, traveling in a forward direction 221. The illustrative example shows right-hand rotor set 202 includes right-hand forward rotor 104A (e.g., labeled F), right-hand midship rotor 104B (e.g., labeled M), and right-hand aft rotor 104C (e.g., labeled A). Left-hand rotor set 203 includes left-hand forward rotor 104D (e.g., labeled F̲), left-hand midship rotor 104E (e.g., labeled M̲) and left-hand aft rotor 104F (e.g., labeled A̲). Rotors of right-hand rotor set 202 and left-hand rotor set 203 are arranged in symmetrically opposite pairs relative to a center of gravity 211 of airframe 201, as shown in FIG. 2. In this regard, symmetrically opposite pairs include 104A and 104F, 104B and 104E, and 104C and 104D, as illustrated in FIG. 2.

As illustrated, airframe 201 includes struts identified as struts 216A-216F, each having a first end fixed to airframe 201. For example, strut 216A extends longitudinally from airframe 201 and having a second end fixed to right-hand forward rotor 104A. As shown in FIG. 2, each strut 216A-216F extends longitudinally from airframe 201 and has a second end fixed to a respective one of rotors 104A-104F.

Figure 3B:
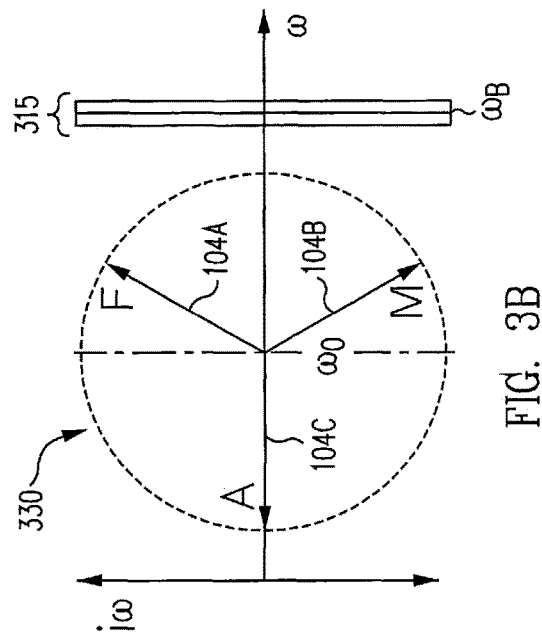
FIGS. 3A to 3F illustrate diagrams of a multi-rotor vehicle under control laws in stable, level flight in accordance with examples of the disclosure.
Figure 3A:
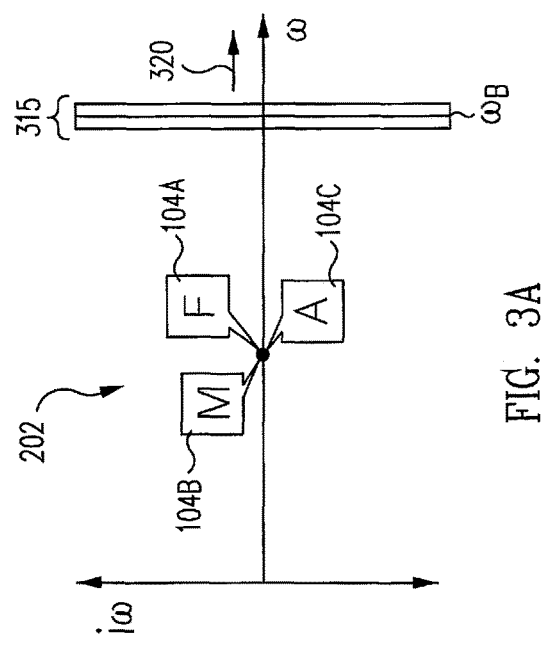

FIGS. 3A to 3F illustrate diagrams of a multi-rotor vehicle 100 under control laws in stable, level flight in accordance with an example of the disclosure. As illustrated in FIG. 3A, controlling the multi-rotor vehicle 100 does not constrain rotor speeds for takeoff or landing. Any flight control law that avoids a long dwell near $\omega_B$ is compatible with the aspect of controlling the multi-rotor vehicle 100 at low speed. FIG. 3A illustrates that before rotor speed approaches a no-dwell zone 315, the average speed of right-hand forward rotor 104A (e.g., labeled F), right-hand midship rotor 104B (e.g., labeled M), and right-hand aft rotor 104C (e.g., labeled A) of right-hand rotor set 202 are approximately equivalent.

After takeoff, multi-rotor vehicle 100 settles into straight, level flight at relatively low speed. FIG. 3A shows a simple flight control regime where right-hand forward rotor 104A, right-hand midship rotor 104B, and right-hand aft rotor 104C rotate at the same speed in the same direction (e.g., speed variation to maintain level flight is not shown). As shown in FIG. 3A, the x-axis is angular velocity, ω, with increasing angular velocity moving in a direction 320, $\omega_B$ is an angular velocity (e.g., rotational speed of rotor 104) to avoid, a no-dwell zone 315 (e.g., a range of keep-out rotational speed values on both sides of $\omega_B$, and the y-axis is iω, where i is the square root of −1.

The next step is to spread rotor 104 speeds, with rotors 104A-104F of FIG. 3A (e.g., physically oriented as shown in FIG. 2) comprising a mathematically related set of three rotational speeds that form a circle in a complex plane as illustrated in FIG. 3B for right-hand rotor set 202. FIG. 3B shows right-hand rotor set 202 to illustrate a starboard trefoil configuration 330 of rotor speed phasors on one side of multi-rotor vehicle 100 (e.g., the coordinate system and mathematics). It is noted that phasor diagrams of FIGS. 3A-7C illustrate angular velocity phasors of any of rotors 104A-104M identified in the corresponding figures.

The rotor speeds for rotors 104A-104C of right-hand rotor set 202 are described by equations 1.1, 1.2, and 1.3.

$$\omega_A = \omega_0 + r_0 [\cos(\theta) + i\sin(\theta)] \quad \text{equation 1.1}$$

$$\omega_M = \omega_0 + r_0 [\cos(\theta + 2\pi/3) + i\sin(\theta + 2\pi/3)] \quad \text{equation 1.2}$$

$$\omega_F = \omega_0 + r_0 [\cos(\theta + 4\pi/3) + i\sin(\theta + 4\pi/3)] \quad \text{equation 1.3}$$

where ωi [i=A, M, F] is angular velocity of a rotor 104, $\omega_0$ is mean velocity of the three rotors (e.g., 104A-104C), $r_0$ is the magnitude of the complex difference between each rotor's angular velocity and $\omega_0$, θ is an angle in the complex plane, and i is the square root of −1. In FIG. 3B, θ=π, and cos(θ)=−1.

Regardless of θ's value, total angular momentum, L, of rotors 104A-104C is given by equation 1.4.

$$L = 3I\omega_0 \quad \text{equation 1.4}$$

where I is each rotor 104A-104C moment of inertia, and total kinetic energy, E, of the three rotors 104A-104C is given by equation 1.5.

$$E = I/2 [3\omega_0^2 + 3r_0^2/2] \quad \text{equation 1.5}$$

Both L and E are independent of starboard trefoil configuration 330 orientation in the complex plane. Angular momentum and kinetic energy increase as $\omega_0$ increases. Total angular momentum does not increase as trefoil radius $r_0$ increases, and total kinetic energy does increase. Multi-rotor vehicle 100 can fly safely with one rotor pair (e.g., such as rotor 104A and rotor 104F of FIG. 2) turned off.

Figure 3D:
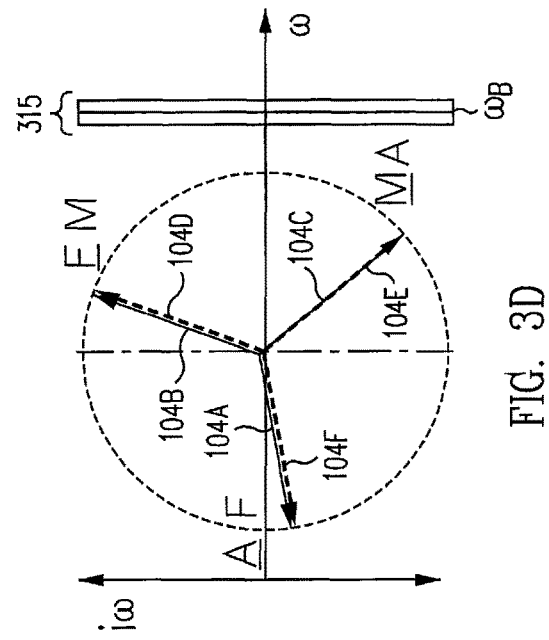
Figure 3C:
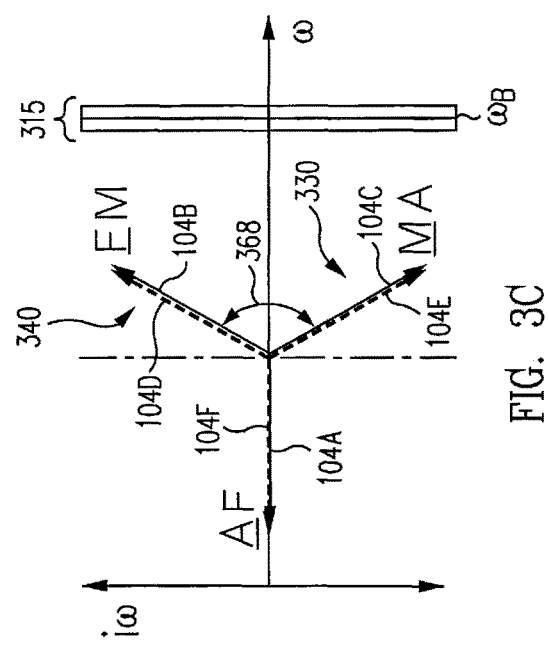

In stable, level flight, starboard trefoil configuration 330 (e.g., a first trefoil configuration) comprising right-hand rotor set 202 of starboard side rotors 104A-104C, and a port trefoil configuration 340 (e.g., a second trefoil configuration) comprising left-hand rotor set 203 of port side rotors 104D-104F, overlay each other, and are oriented one hundred twenty degrees out of phase, as illustrated in FIG. 3C by angle 368.

In one example, a first number of the rotors 104 oriented in right-hand rotor set 202 (e.g., a first group) at a starboard side 205 are substantially equal to a second number of the rotors 104 oriented in left-hand rotor set 203 (e.g., a second group) at a port side 210. In various examples, each one of rotors 104A-104C in the first group are arranged symmetrically opposite a corresponding one of rotors 104D-104F in the second group to provide a plurality of symmetrically opposite pairs of rotors relative to a center of gravity 211 of airframe 201. The rotor pairs are balanced. Inevitably, perturbations knock the vehicle out of stable, level flight.

In various examples, the rotors comprise a total of six rotors 104A-104F. Fewer or more rotors 104 are possible in other examples (e.g., in some examples, between three and twelve rotors 104), and fewer or more symmetrically opposite pairs of rotors are possible in other examples (e.g., in some examples, between two and six symmetrically opposite pairs). In some examples, rotors 104A-104F are configured to rotate in a same rotational direction, and controller 120 is configured to maintain a substantially equal rotational speed between the rotors of each of the symmetrically opposite pairs of rotors, as described herein.

Pitch, roll, and yaw control, and a trefoil configuration control technique are described and illustrated in FIG. 3D. These basic patterns for roll, pitch, and yaw control operate in the background of the operations described herein.

To pitch down, starboard trefoil configuration 330 and port trefoil configuration 340 move counterclockwise (in phase space) from a stable position as illustrated in FIG. 3D. Changing the trefoil reference angle, $\theta$, makes the vehicle pitch up or down. Increased $\theta$ causes downward pitch in multi-rotor vehicle 100. As shown in FIG. 3D, rotor 104C (e.g., aft starboard rotor) rotates faster, and therefore produces more lift, than rotor 104D (e.g., forward port rotor). This produces torque that makes the vehicle pitch down. Rotor 104F (e.g., port aft rotor) and rotor 104A (e.g., starboard forward rotor) have the same (slow) speed, so they produce no net torque about the pitch axis.

The net roll torque for this maneuver is zero. Decreased portside lift from rotor 104D going slower is compensated by increased lift from the rotor 104F, rotor 104C, and rotor 104E going faster. Referring again to FIG. 2, s similar rotational speed produces net zero change in torque from starboard side 205. Net yaw torque is zero, too, because the total angular momentum, L, of rotors 104A-104F does not change.

To pitch up, controller 120 decreases $\theta$, i.e., it rotates starboard trefoil configuration 330 and port trefoil configuration 340 clockwise in phase space. That reverses the effects described regarding FIG. 3D, and produces upward pitch.

Figure 3F:
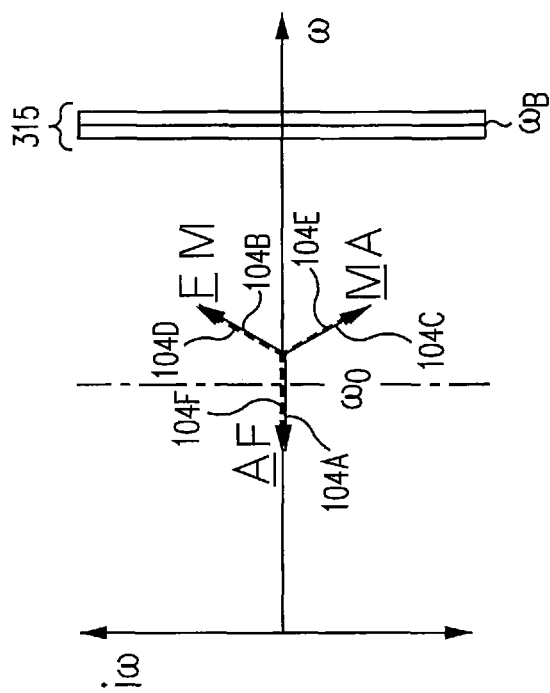
Figure 3E:
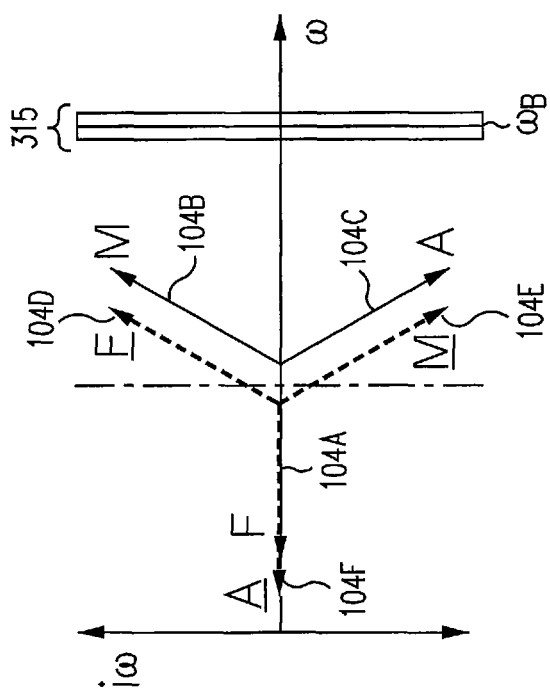

To roll left, referring again to FIG. 2, rotors 104A-104C of right-hand rotor set 202 at a starboard side 205 rotate fastest than rotors 104D-104F of left-hand rotor set 203 at a port side 210, producing more lift on starboard side as illustrated in FIG. 3E. As shown in FIG. 3E, to roll multi-rotor vehicle 100 left, controller 120 increases the average angular velocity of rotors 104A-104C of starboard trefoil configuration 330 by $\Delta\omega$ while decreasing the average angular velocity of rotors 104D-104F of port trefoil configuration 340 by the same amount.

The equations describing this maneuver are slightly modified from equations 1.1, 1.2, and 1.3. The starboard trefoil configuration 330 is described by equations 1.7, 1.8, and 1.9:

$$\omega_{As}=\omega_0+\Delta\omega+r_0\ [\cos\ (\theta)+i\ \sin\ (\theta)] \quad \text{equation 1.7}$$

$$\omega_{Ms}=\omega_0+\Delta\omega+r_0\ [\cos\ (\theta+2\pi/3)+i\ \sin\ (\theta+2\pi/3)] \quad \text{equation 1.8}$$

$$\omega_{Fs}=\omega_0+\Delta\omega+r_0\ [\cos\ (\theta)+4\pi/3)+i\ \sin\ (\theta+4\pi/3)] \quad \text{equation 1.9}$$

The port trefoil configuration 340 is described by equations 1.10, 1.11, and 1.12:

$$\omega_{Ap}=\omega_0-\Delta\omega+r_0\ [\cos\ (\theta)+i\ \sin\ (\theta)] \quad \text{equation 1.10}$$

$$\omega_{Mp}=\omega_0-\Delta\omega+r_0\ [\cos\ (\theta+2\pi/3)+i\ \sin\ (\theta+2\pi/3)] \quad \text{equation 1.11}$$

$$\omega_{Fp}=\omega_0-\Delta\omega+r_0\ [\cos\ (\theta+4\pi/3)+i\ \sin\ (\theta+4\pi/3)] \quad \text{equation 1.12}$$

Net yaw torque is zero because the total angular momentum, L, is unchanged. Net pitch torque is zero for small $\Delta\omega$ because a speed change for a forward rotor or aft rotor is balanced by the opposite speed change for the other rotor in the balanced pair. For large $\Delta\omega$, the fact that lift is proportional to the square of rotor 104 speed means the increase and the decrease does not fully balance each other. Correcting for these nonlinearities is well understood by those skilled in the art.

To yaw right, right-hand rotor set 202 at starboard side 205 and a left-hand rotor set 203 at port side 210 rotate faster on average, with angular velocities that are more similar than in straight, level flight as illustrated in FIG. 3F. Yaw control is done by changing average angular velocity, $\omega_0$, and the trefoil radius, $r_0$. For example, FIG. 3F illustrates multi-rotor vehicle 100 using increased $\omega_0$ and decreased $r_0$ to perform a yaw to the right. Assuming rotors 104A-104F rotate counterclockwise, an increase in average angular velocity $\omega_0$ means rotors 104A-104F have greater angular momentum, L, counterclockwise. Conservation of angular momentum, L, means that multi-rotor vehicle 100 then yaws clockwise, i.e., to the right.

Singularly increasing the rotors 104A-104F rotational speeds would increase lift. To avoid that, controller 120 reduces $r_0$, the difference among the rotors 104A-104F angular velocities $\omega$, to keep kinetic energy constant in accordance with equation 1.5. Since rotor lift and rotor kinetic energy are both proportional to $\omega^2$, keeping kinetic energy constant also keeps lift constant. To yaw to the left, right-hand rotor set 202 at starboard side 205 and left-hand rotor set 203 at port side 210 rotate slower on average (lower $\omega_0$), with angular velocities $\omega_0$ that are more dissimilar (e.g., larger magnitude of $r_0$).

After multi-rotor vehicle 100 takes off and achieves stable, level flight, it increases speed. Increasing vehicle speed increases rotational speed of the rotors 104A-104F. In one example, controller 120 receives sensor information (e.g., rotor configuration information 114 and/or system images information 112) that starboard trefoil configuration 330 and/or port trefoil configuration 340 encroaches on no-dwell zone 315.

No-dwell zone 315 is wide enough to avoid a structural resonance of multi-rotor vehicle 100 if one or more rotors 104A-104F dwells for a long time at a particular speed in straight, level flight. In addition, no-dwell zone 315 allows for a rotor 104 that occasionally exceeds its steady-state speed, e.g., as part of a pitch, roll, or yaw maneuver, or in response to a sudden need to increase total lift. For example, no-dwell zone 315 is particular to a multi-rotor vehicle configuration. In this regard, no-dwell zone 315 is determined for each type of multi-rotor vehicle 100, and each type of mission or payload within multi-rotor vehicle 100, with the resulting no-dwell zone 315 (e.g., no-dwell zone information) programmed into controller 120 and/or stored in memory 122, and/or executed by controller 120 from machine readable medium 124.

Multi-rotor vehicle 100 increases speed until rotors 104 rotational speeds approaches no-dwell zone 315, as illustrated in FIG. 4A. When speed is increasing, rotational speeds of rotor 104D of port trefoil configuration 340 and rotor 104C of starboard trefoil configuration 330 rotate at a rotational speed just slower than a lower speed 315A of no-dwell zone 315, as shown in FIG. 4A. At this point, controller 120 executes a jump.

Controller 120 provides a first commanded phasor angle 445 to each rotor in starboard trefoil configuration 330 to rotate in a counter-clockwise phasor direction. Controller 120 provides a second commanded phasor angle 446 to each rotor in port trefoil configuration 340 to rotate in a clockwise phasor direction. As shown in FIG. 4B, starboard trefoil configuration 330 rotates in a direction opposite to a direction of port trefoil configuration 340. In this regard, rotational speeds of the opposite pairs of rotors are adjusted to cause at least one opposite pair of rotors with rotational speeds nearest the no-dwell zone 315(e.g., rotor 104C of starboard trefoil configuration 330 and rotor 104D of port trefoil configuration 340) to rapidly traverse the no-dwell zone, and a mean angular velocity $\omega_0$ of the rotors is substantially constant during the traverse, as shown in FIG. 4C.

In some examples, after the first jump, starboard trefoil configuration 330 and port trefoil configuration 340 have rotated sixty degrees in opposite directions in phase space. Other rotations are possible in other examples. FIG. 4C illustrates the result of the first jump. Rotor 104C of starboard trefoil configuration 330 and rotor 104D of port trefoil configuration 340 (e.g., symmetrically opposite pairs) are now rotating at a rotational speed faster than upper speed 315B of no-dwell zone 315. That is, two rotors now rotate faster than $\omega_B$.

The jump is generally performed quickly so no rotor dwells for a long period of time in no-dwell zone 315. The aspect of controlling the multi-rotor vehicle 100 in this manner allows this change to be very fast. Total angular momentum, L, and total kinetic energy are unchanged by the jump, and no pitch, roll, or yaw moment is produced by the jump itself (e.g., standard pitch, roll, and yaw maneuvers, as described herein, may be superimposed on rotational speed changes that define the jump). A benefit of the rotor control laws, as described herein, is that the torque exerted on one or more motor mounts of airframe 201 is lower than for general rotor control laws.

As shown in FIG. 4C, rotor 104C and rotor 104D that are fast-rotating are well above the no-dwell zone 315. FIG. 4C illustrates, for clarity, trefoils with $r_0$ larger than necessary. In this regard, after choosing a width of no-dwell zone 315, a user may choose a value of $r_0$ for stable, level flight to be large enough for a one hundred twenty degree change in $\theta$ to move a rotor from just below the no-dwell zone 315 to just above it, plus enough margin to give some hysteresis, i.e., if a disturbance right after the jump causes multi-rotor vehicle 100 to slow down a slight amount, multi-rotor vehicle 100 would not need to reverse the jump. In various examples, the width of no-dwell zone 315 and choice of hysteresis margin is particular to each type of multi-rotor vehicle 100, and mission and/or payload, as described herein.

After the first jump, the relationship between the trefoils has changed. Controller 120 reverses the direction of starboard trefoil configuration 330 and port trefoil configuration 340 to cause multi-rotor vehicle 100 to pitch up or pitch down, for example. Controller 120 provides commands to rotors 104A-104F to increase rotational speed until rotor 104B of starboard trefoil configuration 330 and rotor 104E of port trefoil configuration rotate at a rotational speed just slower than a lower speed 315A of no-dwell zone 315, as shown in FIG. 4D. In this regard, controller 120 provides a third commanded phasor angle 447 to each rotor in starboard trefoil configuration 330 to rotate in a clockwise phasor direction. Controller 120 provides a fourth commanded phasor angle 448 to each rotor in port trefoil configuration 340 to rotate in a counter-clockwise phasor direction.

As shown in FIG. 4D, starboard trefoil configuration 330 rotates in a direction opposite to a direction of port trefoil configuration 340. In this regard, rotational speeds of the opposite pairs of rotors are adjusted to cause at least one opposite pair of rotors with rotational speeds nearest the no-dwell zone 315 (e.g., rotor 104B of starboard trefoil configuration 330 and rotor 104E of port trefoil configuration 340) to rapidly traverse the no-dwell zone 315, and a mean angular velocity $\omega_0$ of the rotors is substantially constant during the traverse, as shown in FIG. 4E.

As illustrated in FIG. 4E, the second jump leaves one rotor pair below $\omega_B$ and no-dwell zone 315. Starboard trefoil configuration 330 and port trefoil configuration 340 have reversed their earlier sixty-degree rotations from the first jump (e.g., first jump as shown in FIG. 4C). Two pairs of rotors 104 of starboard trefoil configuration 330 and port trefoil configuration 340 now have speeds above no-dwell zone 315. Controller 120 reverses the direction of starboard trefoil configuration 330 and port trefoil configuration 340 to cause multi-rotor vehicle 100 to pitch up or pitch down, for example.

After the second jump, multi-rotor vehicle 100 continues increasing speed until the slowest leg of each trefoil nears the lower speed 315A of no-dwell zone 315 as illustrated in FIG. 4F. The controller executes the third jump by repeating the trefoil rotations of the first jump.

The third jump provides that the rotors 104A-104F are moving faster than no-dwell zone 315 as illustrated in FIG. 4G. Controller 120 changes the direction of trefoil rotation to pitch up or down again. When the rotors 104A-104F are rotating at a rotational speed substantially faster than upper speed 315B of no-dwell zone 315, it is permissible to maintain starboard trefoil configuration 330 and port trefoil configuration 340.

Multi-rotor vehicle 100 may use whatever flight control law is appropriate, and rotors 104 may operate at the same speed for straight, level flight as shown for rotors 104A, 104B, and 104C of right-hand rotor set 202 in FIG. 4H.

At any point from takeoff through maximum speed, the process can be reversed. Controller 120 reduces speed until one or two rotors 104 of starboard trefoil configuration 330 and port trefoil configuration 340 approaches upper speed 315B of no-dwell zone 315. Controller 120 then performs a jump to quickly traverse rotors 104 nearest upper speed 315B across no-dwell zone 315. Controller 120 repeats the process until the rotational speeds of rotors 104A-104F are below no-dwell zone 315.

FIGS. 5A and 5B illustrate diagrams of a multi-rotor vehicle 100 including rotors 104 rotating in opposite directions in accordance with an example of the disclosure. FIG. 5A illustrates multi-rotor vehicle 100 with rotors 104A-104C of starboard trefoil configuration 330 and rotors 104D-104F of port trefoil configuration 340 rotating in opposite directions. For example, port trefoil configuration 340 rotors 104D-104F rotate in a positive direction with average angular velocity $\omega_0$ and starboard trefoil configuration 330 rotors 104A-104C rotate in a negative direction with average angular velocity $-\omega_0$. Total angular momentum, L, of rotors 104A-104F for this configuration is zero. Further, kinetic energy does not depend on the direction of rotation, and therefore, total kinetic energy is the same as for a system where rotors rotate in the same direction.

A structural resonant frequency does not depend on the direction of rotation, and therefore, no-dwell zone 315 is included in the positive omega and negative omega half-planes. FIG. 5A illustrates phasor diagrams of rotors 104A-104C of starboard trefoil configuration 330 and rotors 104D-104F of port trefoil configuration 340 just prior to first jump over no-dwell zone 315.

FIG. 5B illustrates a phasor diagram after the first jump. Controller 120 has commanded starboard trefoil configuration 330 to rotate sixty degrees counterclockwise, causing rotor 104C to rotate faster than rotational speeds of no-dwell zone 315. Controller 120 has commanded port trefoil configuration 340 to rotate sixty degrees clockwise, causing rotor 104D to rotate faster than rotational speeds of no-dwell zone 315. The symmetrically opposite pairs of rotors remain balanced, and therefore, multi-rotor vehicle 100 continues straight and level flight.

In one example, multi-rotor vehicle 100 includes the rotors 104D-104F rotating in one direction and the rotors 104A-104C rotating in an opposite direction, and other combinations are possible in other examples. In some examples, forward and aft rotors on one of port side 210 or starboard side 205 may rotate clockwise, while midship rotor on the same side rotate in a counterclockwise direction. In other examples, some rotors may be grouped in counter-rotating coaxial pairs. In such examples, rotating phasors of starboard trefoil configuration 330 and port trefoil configuration 340 preserve total angular momentum, L, of rotors 104A-104F and total kinetic energy of rotors 104A-104F.

For a very brief flight interval, such as a quick speed change by one or two rotors, "controlled flight" means that multi-rotor vehicle 100 does not incur a sudden change in pitch rate, roll rate, yaw rate, or vertical acceleration (e.g. a stable and level flight). Each of these four behaviors is responsive to one of four dynamics values; torque about the pitch, roll, and yaw axes, and force of lift. These dynamics values can be described by equations 1.13, 1.14, 1.15, and 1.16 which are functions of rotor speed, omega, for the rotors 104.

$$T\_pitch = f\_1(Omega\_1, Omega\_2 \ldots) \quad \text{equation 1.13}$$

$$T\_roll = f\_2(Omega\_1, Omega\_2 \ldots) \quad \text{equation 1.14}$$

$$T\_yaw = f\_3(Omega\_1, Omega\_2 \ldots) \quad \text{equation 1.15}$$

$$F\_lift = f\_4(Omega\_1, Omega\_2 \ldots) \quad \text{equation 1.16}$$

where T indicates torque about the respective axis, F indicates force, and f_i is a function that depends on the locations and orientations of the rotors 104 on airframe 201.

Equations 1.13, 1.14, 1.15, and 1.16 yield four dynamics values. In this regard, control of multi-rotor vehicle 100 is dependent on how many variables (e.g., how many rotor speeds) go into the equations 1.13, 1.14, 1.15, and 1.16.

Multi-rotor vehicle 100 with five or more variables (e.g., angular speed omega_i for each of five or more rotors) provides for many solutions for a given set of dynamics values. For example, a dynamics vector (T_pitch_0, T_roll_0, T_yaw_0, F_lift_0) corresponds to infinitely many variable vectors (omega_1, omega_2 . . . omega_n), for n greater than four. The dynamics vector may be held constant while changing rotor speeds to meet goals such as mitigating an object strike or avoiding structural resonance frequencies. FIG. 2 illustrates six rotors in three balanced pairs as an example, where rotor speeds change, and pitch rate, roll rate, yaw rate, and rotor kinetic energy (lift) are constant.

Multi-rotor vehicle 100 with four variables (e.g., angular speed omega_i for each of four rotors) provides for a single solution for a given set of dynamics values. For example, a dynamics vector (T_pitch_0, T_roll_0, T_yaw_0, F_lift_0) corresponds to a single variable vector (omega_1, omega_2 . . . omega_n) where n=four. If any of the rotor speeds change, elements of the dynamics vector may vary. For example, a rapid increase in speed of rotor 104 to jump over a structural resonance frequency, and an increase or decrease in other rotor speeds to maintain constant torque about the pitch, roll, and yaw axes may cause dynamic elements to vary. The four dynamics values are dynamic, so the vehicle lift (and the kinetic energy of the rotors) will change. Alternatively, the fourth dynamics values may be controlled by other means, such as aerodynamic control surfaces or variable rotor pitch.

Multi-rotor vehicle 100 with fewer than four variables (e.g., speed omega_i for three rotors) does not provide for a single solution that satisfies the four equations. For example, a given dynamics vector (T_pitch_0, T_roll_0, T_yaw_0, F_lift_0) has no solution. Three rotors satisfy three of the equations with exactly one variable vector (omega_1, omega_2, omega_3), or two of the equations with infinitely many variable vectors. In some examples, rotor speeds of a three rotor multi-rotor vehicle 100 control lift and one of the rotational axes (e.g., yaw) allowing rotor speeds to vary while holding lift force and yaw torque constant. Control of the other two axes is controlled by other means, such as control surfaces 135 or a variable rotor pitch (e.g., not shown).

FIGS. 6A to 6C illustrate diagrams of a four rotor multi-rotor vehicle 100 under control laws in stable level flight in accordance with an example of the disclosure. As illustrated in FIG. 6A, in one example, multi-rotor vehicle 100 includes a right-hand rotor set 602 at a starboard side 605 and a left-hand rotor set 603 at a port side 610, for a total of four rotors 104, traveling in a forward direction 621. The illustrative example shows right-hand rotor set 602 includes right-hand forward rotor 104G (e.g., labeled F), and right-hand aft rotor 104H (e.g., labeled A). Left-hand rotor set 603 includes left-hand forward rotor 104I (e.g., labeled F̲), and left-hand aft rotor 104J (e.g., labeled A̲). Rotors of right-hand rotor set 602 and left-hand rotor set 603 are arranged in symmetrically opposite pairs relative to a center of gravity 211 of airframe 201, as shown in FIG. 6A. In this regard, symmetrically opposite pairs include 104G and 104J, and 104H and 104I, as illustrated in FIG. 6A.

As illustrated, airframe 201 includes struts identified as strut 216G, strut 216H, strut 216I, and strut 216J, each having a first end fixed to airframe 201. For example, strut 216G extends longitudinally from airframe 201 and having a second end fixed to right-hand forward rotor 104G. As shown in FIG. 6A, each strut 216G-216J extends longitudinally from airframe 201 and has a second end fixed to one of rotors 104G-104J, respectively.

FIG. 6B illustrates a tetrad configuration 350 of rotor speed phasors on multi-rotor vehicle 100. Tetrad configuration 350 comprises rotor 104G-104J as shown in FIG. 6B. When speed of multi-rotor vehicle 100 is increasing, rotational speeds of rotor 104I and rotor 104J approach a rotational speed just slower than a lower speed 315A of no-dwell zone 315.

Controller 120 provides a tetrad commanded phasor angle 645 (e.g., first commanded phasor angle) to each rotor in tetrad configuration 350 to rotate in a clockwise phasor direction to execute a jump. In this regard, rotational speed of rotor 104I is adjusted to cause rotor 104I to rapidly traverse no-dwell zone 315, and a mean angular velocity $\omega_0$ of the rotors is substantially constant during the traverse, as shown in FIG. 6C.

Rotation of tetrad configuration 350 preserves total angular momentum, L, and kinetic energy of rotors 104G-104J. It is noted that tetrad configuration 350 does not preserve pitch as rotational speed of rotor 104I and rotor 104G has increased after the jump, and rotational speed of rotor 104H and rotor 104J has decreased. In the example shown, one or more rotors 104G-104J has a controllable angle of attack, such that an angle of attack of at least one of rotor 104G and rotor 104I decreases, and at least one of rotor 104J and rotor 104H increases. This results in a reduction in T_pitch (e.g., T_pitch of equation 1.13) caused by tetrad configuration 350 rotation in phase space. In some examples, controller 120 adjusts one or more control surfaces 135 to maintain stable, level flight of multi-rotor vehicle 100 in response to the reduction in T_pitch.

If there are fewer than four variables (e.g., speed omega_i for three rotors), then there is not a guaranteed solution that satisfies the four equations 1.13, 1.14, 1.15, and 1.16. In this regard, a dynamics vector (e.g., such as T_pitch_0, T_roll_0, T_yaw_0, F_lift_0) typically has no solution. In one example with three rotors, three of the equations with exactly one variable vector (omega_1, omega_2, omega_3), or two of the equations with infinitely many variable vectors can be satisfied. In various examples of a three rotor multi-rotor vehicle 100, the three rotor speeds control lift and one of the rotational axes, (e.g., such as yaw) allowing rotor speeds to vary while holding lift force and yaw torque constant. Control of the other two axes is controlled by other means, such as aerodynamic control surfaces or a variable rotor pitch.

Figure 7B:
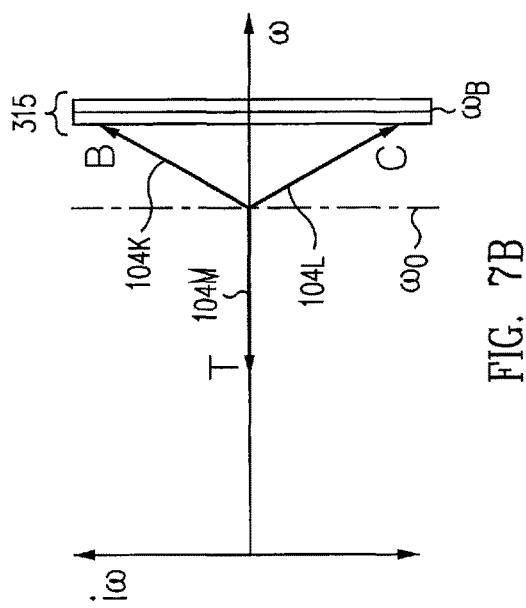
FIGS. 7A to 7C illustrate diagrams of a trefoil configuration of a three rotor multi-rotor vehicle in accordance with examples of the disclosure.
Figure 7A:
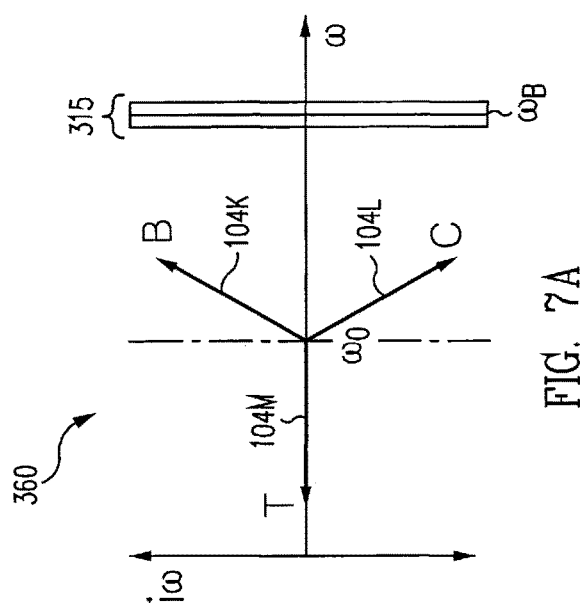
Figure 7C:
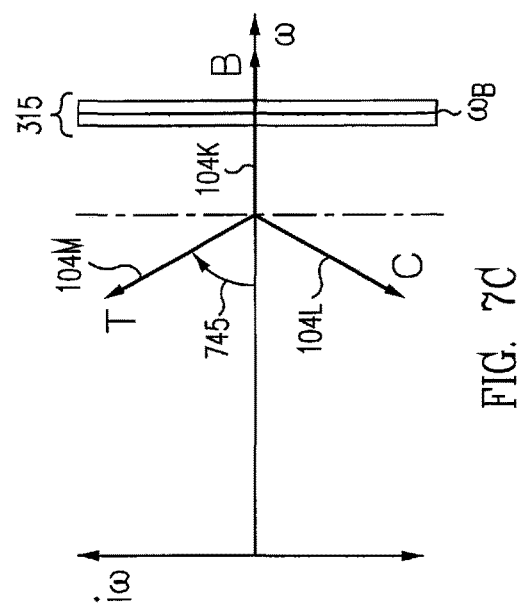

FIGS. 7A to 7C illustrate diagrams of a trefoil configuration of a three rotor multi-rotor vehicle 100 accordance with an example of the disclosure. As illustrated in FIG. 7A, in one example, multi-rotor vehicle 100 includes a trefoil configuration 360 of rotor speed phasors on multi-rotor vehicle 100. Trefoil configuration 360 comprises rotors 104K-104M with rotational speeds less than no-dwell zone 315 and a mean angular velocity $\omega_0$. When speed of multi-rotor vehicle 100 is increasing, rotational speeds of rotor 104K and rotor 104L rotate at a rotational speed just slower than lower speed 315A of no-dwell zone 315, as shown in FIG. 7B.

As shown in FIG. 7C, controller 120 provides a commanded phasor angle 745 (e.g., a first commanded phasor angle) to each rotor in trefoil configuration 360 to rotate in a clockwise phasor direction. In this regard, rotational speeds of rotors 104K-104M are adjusted to cause at least rotor 104K with rotational speed nearest the no-dwell zone 315 to rapidly traverse the no-dwell zone 315, and a mean angular velocity $\omega_0$ of the rotors is substantially constant during the traverse, as shown in FIG. 7C. Kinetic energy and total angular momentum, L, of rotors 104K-104M are constant, and multi-rotor vehicle 100 maintains stable and level flight through the jump. In some examples, controller 120 adjusts one or more control surfaces 135 to maintain stable, level flight of multi-rotor vehicle 100 in response to a change in pitch and/or roll of multi-rotor vehicle 100 after the jump.

Figure 8:
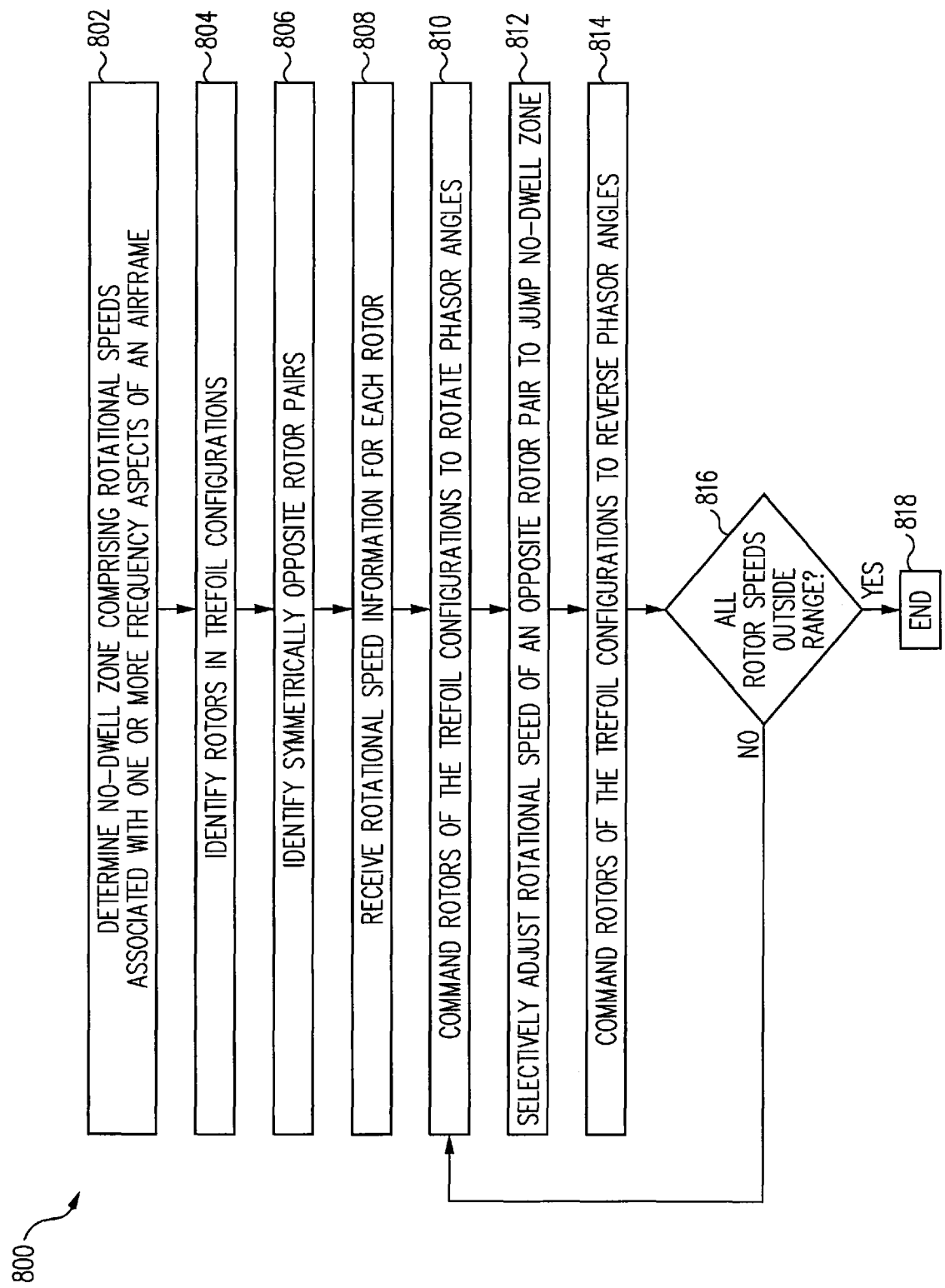
FIG. 8 illustrates a process of avoiding a no-dwell zone of rotational speeds of a six rotor multi-rotor vehicle in accordance with an example of the disclosure.

FIG. 8 illustrates a process (e.g., a method) 800 of avoiding a no-dwell zone of rotational speeds of a six rotor multi-rotor vehicle 100 in accordance with an example of the disclosure. The process may begin at block 802 where controller 120 determines a no-dwell zone 315 that comprises rotational speeds associated with one or more frequency aspects of an airframe 201. In various examples, a no-dwell zone 315 may be determined based on the one or more frequency aspects of airframe 201 comprising one or more resonance frequencies of airframe 201 and a physical configuration of the airframe 201. Further, the no-dwell zone 315 is stored within a memory 122.

Referring again to block 802, in some examples, controller 120 may determine a plurality of rotational speeds associated with one or more frequency aspects of the airframe 201. Controller 120 may further determine a first zone of rotational speeds associated with frequencies less than the one or more frequency aspects of the airframe 201. Controller 120 may further determine a transitional zone of rotational speeds associated with frequencies substantially equivalent to one or more frequency aspects of the airframe 201, and determine a second zone of rotational speeds associated with frequencies greater than the one or more frequency aspects of the airframe 201. In this regard, controller 120 may determine one or more ranges of rotational speeds identified by one or more no-dwell zones 315, where the ranges provide a hysteresis margin.

Referring again to block 802, in one example, controller 120 may command a plurality of rotational speeds generated by one or more of rotors 104 and one or more vibrations may be measured at multi-rotor vehicle 100 associated with the rotational speeds. One or more resonance frequencies of airframe 201 may be determined based on the measured vibrations and a no-dwell zone 315 of rotational speeds associated with the one or more resonance frequencies of the airframe 201 may be determined. In one example, a vibration sensor 137, coupled to airframe 201, provides vibration sensor information 138 of airframe 201 to controller 120 at a vibration sensor signal interface 139.

Referring again to block 802, in various examples, controller 120 monitors the vibration sensor information 138 (e.g., second sensor information). Controller 120 processes the vibration sensor information 138 and adjusts a rotational speed of each of the plurality of rotors 104 such that rotors 104 do not dwell within the no-dwell zone based on vibration sensor information 138.

At block 804, rotors 104 may be identified in one more trefoils configurations where a first group of rotors comprise a first trefoil configuration and a second group of rotors comprise a second trefoil configuration. At block 806, rotors 104A-104C of right-hand rotor set 202 are arranged symmetrically opposite a corresponding one of the rotors 104D-104F of left-hand rotor set 203 to identify a plurality of symmetrically opposite pairs of rotors relative to a center of gravity 211 of the airframe 201. Controller 120 provides commands to the symmetrically opposite pairs of rotors to maintain a substantially equal rotational speed among rotors of the symmetrically opposite pairs.

At block 808, controller 120 receives rotational speed information for each of the rotors 104A-104F. In this regard, controller 120 receives sensor information associated with the rotational speed of the plurality of rotors 104A-104F and determines the rotational speed of each of the plurality of rotors 104A-104F based on the rotational speed information.

At block 810, controller 120 generates a first commanded phasor angle 445 to each of the rotors in the starboard trefoil configuration 330 and generates a second commanded phasor angle 446 to each of the rotors in the port trefoil configuration 340. In this manner, controller 120 commands the rotors of the trefoil configurations to rotate phasor angles. At block 812, based on first commanded phasor angle 445 and second commanded phasor angle 446, the rotational speeds of the opposite pairs of rotors cause at least one opposite pair of rotors with rotational speeds nearest a lower speed 315A of no-dwell zone 315 to rapidly traverse the no-dwell zone 315, while a mean angular velocity of the rotors is substantially constant during the traverse. In this manner, controller 120 selectively adjusts rotational speed of an opposite rotor pair to jump the no-dwell zone 315.

At block 814, controller 120 generates a third commanded phasor angle 447 that is opposite the first commanded phasor angle to each of the rotors in the starboard trefoil configuration 330, and generates a fourth commanded phasor angle 448 that is opposite the second commanded phasor angle to each of the rotors in the port trefoil configuration 340. The third commanded phasor angle 447 and the fourth commanded phasor angle 448 are provided after the rotational speeds of each opposite pair of rotors are adjusted to provide for a pitch up or a pitch down of multi-rotor vehicle 100. In this manner, controller 120 commands rotors of the trefoil configurations to reverse their phasor angles.

At block 816, controller 120 determines if opposite pairs of rotors 104A-104F are near a lower speed 315A of no-dwell zone 315, and returns to block 810. If opposite pairs of rotors 104A-104F are outside and are above upper speed 315B of no-dwell zone 315 (e.g., have jumped no-dwell zone 315), the process ends at block 818.

Figure 9:
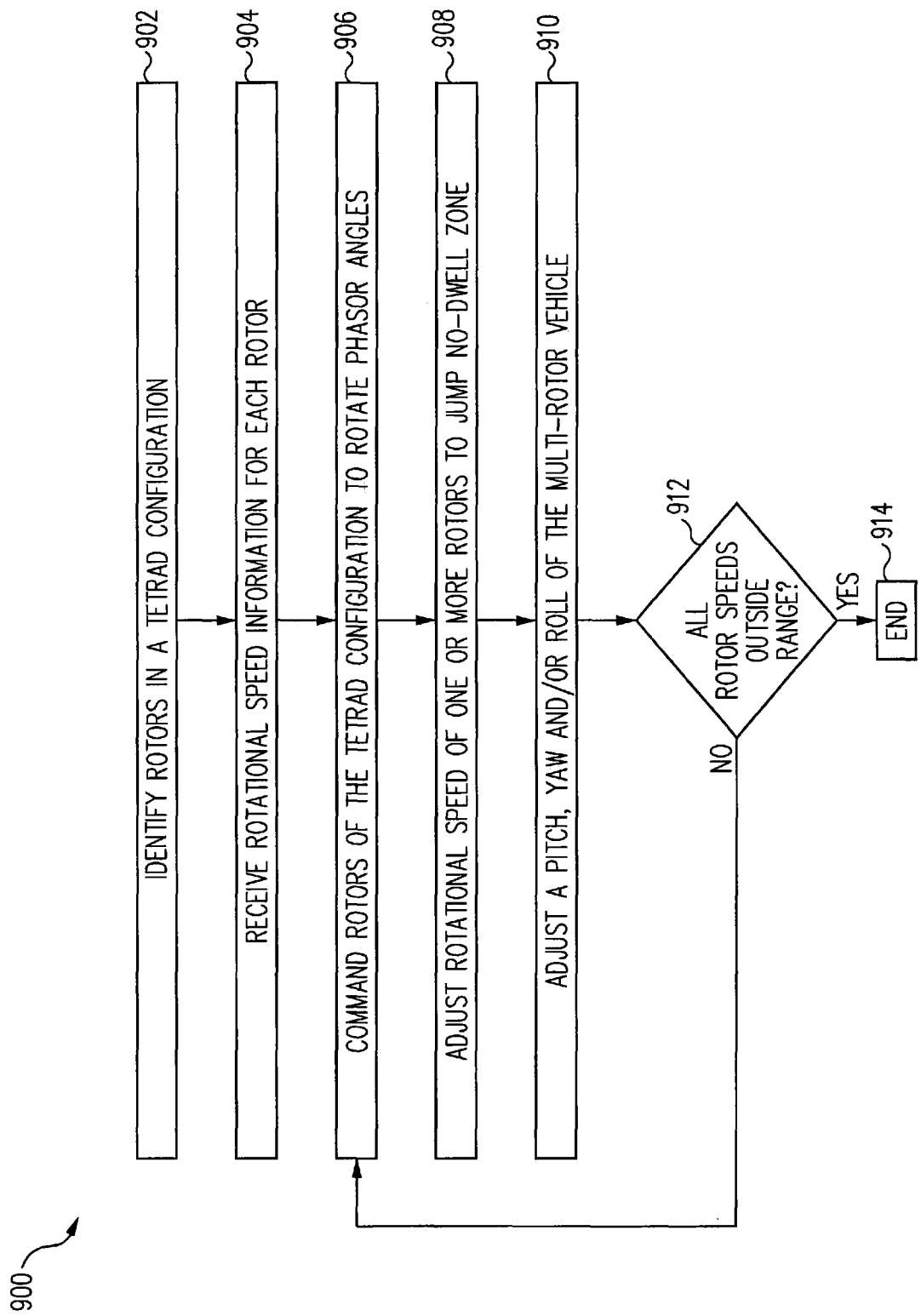
FIG. 9 illustrates a process of avoiding a no-dwell zone of rotational speeds of a four rotor multi-rotor vehicle in accordance with an example of the disclosure.

FIG. 9 illustrates a process (e.g., a method) 900 of avoiding a no-dwell zone 315 of rotational speeds of a four rotor multi-rotor vehicle 100 in accordance with an example of the disclosure. The process may begin at block 902 where rotors 104K-104M are identified in a tetrad configuration 350.

At block 904, controller 120 receives rotational speed for each of the rotors 104. In this regard, controller 120 receives rotor configuration information 114 associated with the rotational speed of each of the plurality of rotors. At block 906, controller 120 generates a tetrad commanded phasor angle 645 for each of the rotors in the tetrad configuration 350. In this manner, controller 120 commands rotors of the tetrad configuration to rotate phasor angles.

At block 908, controller 120 adjusts the rotational speeds of the rotors to cause at least one of the rotors with a rotational speed nearest the no-dwell zone 315 to rapidly traverse the no-dwell zone, and a mean angular velocity of the rotors is substantially constant during the traverse. In this manner, controller 120 adjusts the rotational speed of one or more rotors to jump the no-dwell zone 315.

At block 910, controller 120 adjusts one or more control surfaces 135 to control at least one of a pitch, a yaw, and/or a roll of the multi-rotor vehicle 100 during adjustment of the rotational speed of each of the plurality of rotors 104.

At block 912, controller 120 determines if any of rotors 104K-104M are near a lower speed 315A of no-dwell zone 315, and returns to block 906. If rotors 104K-104M are above upper speed 315B and outside the range of no-dwell zone 315 (e.g., have jumped no-dwell zone 315), the process ends at block 914.

Figure 10:
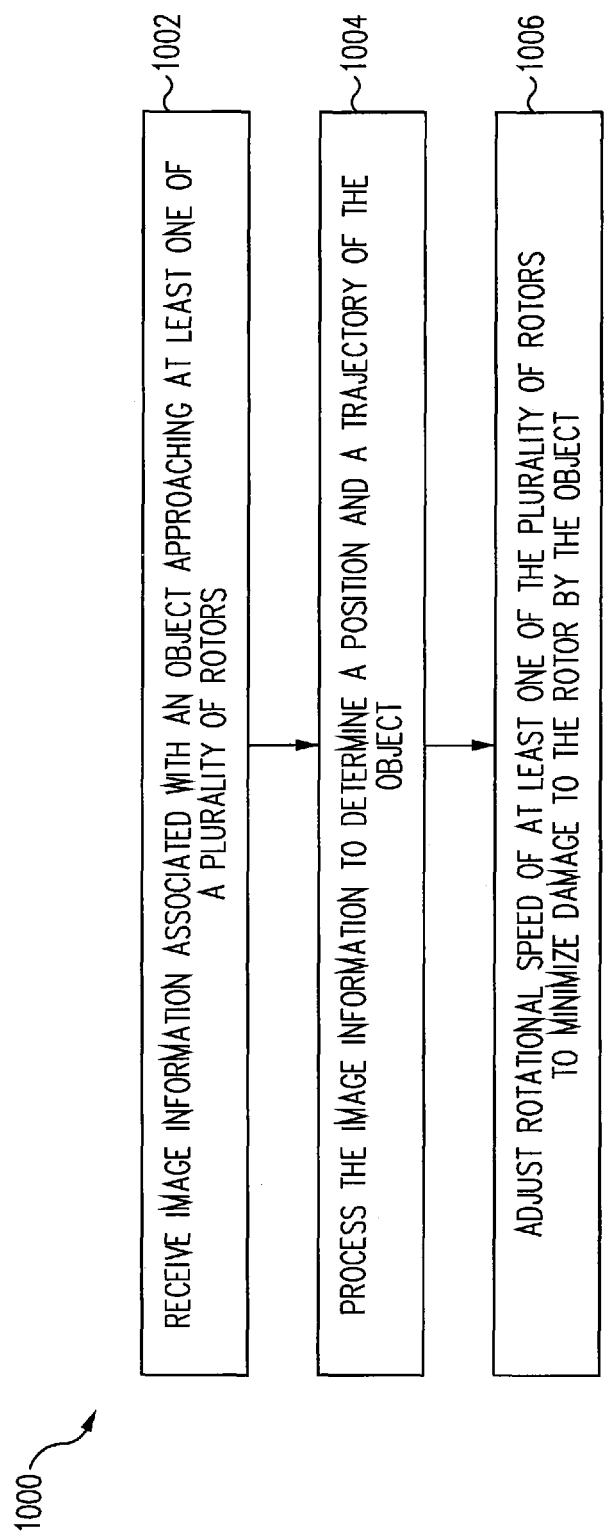
FIG. 10 illustrates a process of avoiding an object strike on a multi-rotor vehicle in accordance with an example of the disclosure.

FIG. 10 illustrates a process (e.g., a method) 1000 of avoiding an object strike on a multi-rotor vehicle in accordance with an example of the disclosure. The process may begin at block 1002 where controller 120 receives system images information 112 of an object 103 approaching at least one of the plurality of rotors. System images information 112 may be provided by at least one of a video imaging camera system 115, a lidar imaging sensor 117, and/or a radar imaging sensor system 119, each configured to capture a plurality of images of object 103 and provide system images information 112 to rotor control system 102.

At block 1004, controller 120 determines a position and a trajectory of the object 103 approaching at least one of the plurality of rotors 104 by processing the image information. At block 1006, controller adjusts the rotational speed of the at least one of the plurality of rotors 104 such that the rotors do not dwell within the no-dwell zone 315, and to minimize damage to the rotors by the object 103. In this regard, controller 120 provides commands to rotors 104 (e.g., generates a commanded phasor angle) to perform a jump, and changes the angular velocity of the endangered rotor 104. Controller 120 chooses the timing of the jump (i.e., its start time and the rate of trefoil rotation) to ensure that endangered rotor 104 either misses the approaching object 103, or takes the object 103 strike at a location on rotor 104 that is less likely to damage rotor 104. In this manner, controller 120 adjusts rotational speed of at least one of the plurality of rotors to minimize damage to the rotor by the object.

In view of the present disclosure, it will be appreciated that a multi-rotor vehicle 100 implemented in accordance with various examples set forth herein may provide for managing rotational speeds of rotors to avoid a no-dwell zone 315 of rotational speeds associated with one or more frequency aspects of an airframe 201 of multi-rotor vehicle 100. The multi-rotor vehicle 100 incorporates a rotor position system 110 to provide rotor configuration information 114 to a rotor control system 102. Rotor control system 102 includes a controller 120 configured to process rotor configuration information to determine rotational speeds of rotors 104 approaching a no-dwell zone 315 of rotational speeds. Controller 120 is further configured to provide commanded phasor angles to trefoil configurations of rotors 104 to allow rotors 104 to rapidly traverse the no-dwell zone 315, while maintaining a stable, level flight of multi-rotor vehicle 100, without affecting mobility of the vehicle or adding extra weight that affect vehicle performance.

Where applicable, various examples provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Examples described above illustrate but do not limit the disclosure. It should also be understood that numerous modifications and variations are possible in accordance with the principles of the present disclosure. Accordingly, the scope of the disclosure is defined only by the following claims.

What is claimed is:

1. A multi-rotor vehicle comprising:

an airframe;
a plurality of rotors coupled to the airframe; and
a controller, coupled to the airframe, configured to:
    determine a rotational speed of each of the plurality of rotors; and
    adjust the rotational speed of each of the plurality of rotors such that the rotors do not dwell within a no-dwell zone comprising rotational speeds associated with one or more frequency aspects of the airframe.

2. The multi-rotor vehicle of claim 1, further comprising a memory, wherein the no-dwell zone is determined based on one or more frequency aspects of the airframe comprising one or more resonance frequencies of the airframe and a physical configuration of the airframe, and wherein no-dwell zone information is stored within the memory.

3. The multi-rotor vehicle of claim 1, further comprising at least one first sensor, coupled to the airframe, configured to provide first sensor information associated with the rotational speed of each of the plurality of rotors, and wherein the controller is configured to receive the first sensor information to determine the rotational speed of each of the plurality of rotors.

4. The multi-rotor vehicle of claim 1, further comprising at least one second sensor, coupled to the airframe, configured to provide second sensor information associated with a vibration of the airframe, wherein the controller is configured to monitor the second sensor information and adjust the rotational speed of each of the plurality of rotors such that the rotors do not dwell within the no-dwell zone based on the second sensor information.

5. The multi-rotor vehicle of claim 1, wherein the plurality of rotors are oriented in one or more groups, wherein a first number of rotors oriented in a first group are substantially equal to a second number of rotors oriented in a second group, and wherein each one of the rotors in the first group are arranged symmetrically opposite a corresponding one of the rotors in the second group to provide a plurality of symmetrically opposite pairs of rotors relative to a center of gravity of the airframe.

6. The multi-rotor vehicle of claim 5, wherein the plurality of rotors comprises six rotors, wherein the rotors are configured to rotate in a same rotational direction, and wherein the controller is configured to maintain a substantially equal rotational speed between the rotors of each of the plurality of symmetrically opposite pairs of rotors.

7. The multi-rotor vehicle of claim 5, wherein the plurality of rotors comprises between three and twelve rotors, and wherein the symmetrically opposite pairs of rotors comprise between two and six symmetrically opposite pairs.

8. The multi-rotor vehicle of claim 5, wherein the rotors of the first group rotate in a first rotational direction and the rotors of the second group rotate in a second rotational direction that is opposite the first rotational direction.

9. The multi-rotor vehicle of claim 5, wherein the first group of rotors comprise a first trefoil configuration and the second group of rotors comprise a second trefoil configuration.

10. The multi-rotor vehicle of claim 9, wherein the controller is further configured to provide a first commanded phasor angle to each of the rotors in the first trefoil configuration and a second commanded phasor angle to each of the rotors in the second trefoil configuration such that the rotational speeds of the opposite pairs of rotors are adjusted to cause at least one opposite pair of rotors with rotational speeds nearest the no-dwell zone to rapidly traverse the no-dwell zone, and wherein a mean angular velocity of the rotors is substantially constant during the traverse.

11. The multi-rotor vehicle of claim 10, wherein the second commanded phasor angle comprises a direction opposite the first commanded phasor angle.

12. The multi-rotor vehicle of claim 10, wherein the controller is configured to provide a third commanded phasor angle that is opposite the first commanded phasor angle to each of the rotors in the first trefoil configuration and a fourth commanded phasor angle that is opposite the second commanded phasor angle to each of the rotors in the second trefoil configuration, and wherein the third commanded phasor angle and the fourth commanded phasor angle are provided after the rotational speeds of each corresponding opposite pair of rotors are adjusted.

13. The multi-rotor vehicle of claim 1, further comprising:
    a third sensor, coupled to the airframe, comprising at least one of a video imaging camera system, a lidar imaging sensor, or a radar imaging sensor system configured to provide image information of an object approaching at least one of the plurality of rotors, wherein the controller is configured to:
        process the image information to determine a position and a trajectory of the object approaching at least one of the plurality of rotors; and
        adjust the rotational speed of the at least one of the plurality of rotors such that the rotors do not dwell within the no-dwell zone, and to minimize damage to the rotors by the object.

14. The multi-rotor vehicle of claim 13, further comprising one or more control surfaces, coupled to the airframe, wherein the controller is configured to adjust the one or more control surfaces to maintain controlled flight of the multi-rotor vehicle.

15. A method of determining the no-dwell zone of claim 1, the method comprising:
    generating a plurality of rotational speeds by the plurality of rotors;
    measuring a vibration at the airframe;
    determining one or more resonance frequencies of the airframe based on the measured vibration; and
    determining the no-dwell zone associated with one or more resonance frequencies of the airframe.

16. A method comprising:
    determining a rotational speed of each of a plurality of rotors coupled to an airframe of a multi-rotor vehicle; and
    adjusting the rotational speed of each of the plurality of rotors such that the rotors do not dwell within a no-dwell zone comprising rotational speeds associated with one or more frequency aspects of the airframe.

17. The method of claim 16, further comprising:
    determining the no-dwell zone based on one or more frequency aspects of the airframe comprising one or more resonance frequencies of the airframe and a physical configuration of the airframe; and
    storing no-dwell zone information within a memory.

18. The method of claim 16, further comprising providing first sensor information associated with the rotational speed of each of the plurality of rotors, wherein the determining comprises determining the rotational speed of each of the plurality of rotors based on the first sensor information.

19. The method of claim 16, further comprising:
    providing second sensor information associated with a vibration of the airframe;
    monitoring the second sensor information; and
    adjusting the rotational speed of each of the plurality of rotors such that the rotors do not dwell within the no-dwell zone based on the second sensor information.

20. The method of claim 16, further comprising:
orienting the plurality of rotors in one or more groups, wherein a first number of rotors oriented in a first group are substantially equal to a second number of rotors oriented in a second group, wherein each one of the rotors in the first group are arranged symmetrically opposite a corresponding one of the rotors in the second group to provide a plurality of symmetrically opposite pairs of rotors relative to a center of gravity of the airframe, and wherein the rotors of the first group and the rotors of the second group rotate in a same rotational direction.

21. The method of claim 20, wherein the rotors of the first group rotate in a first rotational direction and the rotors of the second group rotate in a second rotational direction that is opposite the first rotational direction.

22. The method of claim 20, further comprising:
maintaining a substantially equal rotational speed between the rotors of each of the plurality of symmetrically opposite pairs of rotors; and
selectively adjusting a rotational speed of each opposite pair of rotors such that each opposite pair of rotors do not dwell within the no-dwell zone.

23. The method of claim 20, wherein the first group of rotors comprise a first trefoil configuration and the second group of rotors comprise a second trefoil configuration, the method further comprising:
generating a first commanded phasor angle for each of the rotors in the first trefoil configuration;
generating a second commanded phasor angle for each of the rotors in the second trefoil configuration; and
adjusting the rotational speeds of the opposite pairs of rotors to cause at least one opposite pair of rotors with rotational speeds nearest the no-dwell zone to rapidly traverse the no-dwell zone, wherein a mean angular velocity of the rotors is substantially constant during the traverse.

24. The method of claim 23, wherein the second commanded phasor angle comprises a direction opposite the first commanded phasor angle.

25. The method of claim 23, further comprising:
generating a third commanded phasor angle that is opposite the first commanded phasor angle for each of the rotors in the first trefoil configuration; and
generating a fourth commanded phasor angle that is opposite the second commanded phasor angle for each of the rotors in the second trefoil configuration; and
wherein the third commanded phasor angle and the fourth commanded phasor angle are provided after the rotational speeds of each opposite pair of rotors are adjusted.

26. The method of claim 16, further comprising:
receiving image information associated with an object approaching at least one of the plurality of rotors;
processing the image information to determine a position and a trajectory of the object approaching at least one of the plurality of rotors; and
adjusting the rotational speed of the at least one of the plurality of rotors such that the rotors do not dwell within the no-dwell zone, and to minimize damage to the rotors by the object.

27. The method of claim 26, further comprising adjusting one or more control surfaces, coupled to the airframe, to maintain controlled flight of the multi-rotor vehicle.

28. A multi-rotor vehicle comprising:
an airframe;
a plurality of rotors coupled to the airframe;
one or more control surfaces coupled to the airframe; and
a controller, coupled to the airframe, configured to:
determine a rotational speed of each of the plurality of rotors;
adjust the rotational speed of each of the plurality of rotors such that the rotors do not dwell within a no-dwell zone comprising rotational speeds associated with one or more frequency aspects of the airframe; and
adjust the one or more control surfaces to maintain controlled flight of the multi-rotor vehicle.

29. The multi-rotor vehicle of claim 28, further comprising a memory, wherein the no-dwell zone is determined based on the one or more frequency aspects comprising one or more resonance frequencies of the airframe and a physical configuration of the airframe, and wherein no-dwell zone information is stored within the memory.

30. The multi-rotor vehicle of claim 28, further comprising at least one first sensor, coupled to the airframe, configured to provide first sensor information associated with the rotational speed of each of the plurality of rotors, wherein the controller is configured to receive the first sensor information to determine the rotational speed of each of the plurality of rotors.

31. The multi-rotor vehicle of claim 28, wherein the plurality of rotors comprises four rotors arranged relative to a center of gravity of the airframe, and wherein the rotors rotate in a same rotational direction.

32. The multi-rotor vehicle of claim 31, wherein the rotors comprise a tetrad configuration, wherein the controller is further configured to provide a tetrad commanded phasor angle to each of the rotors in the tetrad configuration such that the rotational speeds of the rotors are adjusted to cause at least one of rotors with rotational speed nearest the no-dwell zone to rapidly traverse the no-dwell zone, wherein a mean angular velocity of the rotors is substantially constant during the traverse.

33. The multi-rotor vehicle of claim 28, wherein the one or more control surfaces are adjusted to control a pitch, a yaw, and/or a roll of the multi-rotor vehicle during adjustment of the rotational speed of each of the plurality of rotors.

34. The multi-rotor vehicle of claim 28, further comprising:
an imaging sensor, coupled to the airframe, comprising at least one of a video imaging camera system, a lidar imaging sensor, or a radar imaging sensor system configured to provide image information of an object approaching at least one of the plurality of rotors, wherein the controller is configured to:
process the image information to determine a position and a trajectory of the object approaching the at least one of the plurality of rotors; and
adjust the rotational speed of the at least one of the plurality of rotors such that the rotors do not dwell within the no-dwell zone, and to minimize damage to the rotors by the object.

35. A method comprising:
determining a rotational speed of each of a plurality of rotors coupled to an airframe of a multi-rotor vehicle;
adjusting the rotational speed of each of the plurality of rotors such that the rotors do not dwell within a no-dwell zone comprising rotational speeds associated with one or more frequency aspects of the airframe; and
adjusting one or more control surfaces, coupled to the airframe, to maintain controlled flight of the multi-rotor vehicle.

36. The method of claim 35, further comprising:

determining the no-dwell zone based on one or more frequency aspects of the airframe comprising an associated one or more resonance frequencies of the airframe and a physical configuration of the airframe; and storing no-dwell zone information within a memory coupled to the airframe.

37. The method of claim 35, wherein the plurality of rotors comprises four rotors arranged relative to a center of gravity of the airframe, wherein the rotors rotate in a same rotational direction, and wherein the plurality of rotors comprise a tetrad configuration, the method further comprising:

receiving sensor information associated with the rotational speed of each of the plurality of rotors;

generating a tetrad commanded phasor angle for each of the rotors in the tetrad configuration; and adjusting the rotational speeds of the rotors to cause at least one of the rotors with rotational speed nearest the no-dwell zone to rapidly traverse the no-dwell zone, wherein a mean angular velocity of the rotors is substantially constant during the traverse.

38. The method of claim 35, further comprising adjusting the one or more control surfaces to control a pitch, a yaw, and/or a roll of the multi-rotor vehicle during adjustment of the rotational speed of each of the plurality of rotors.

39. The method of claim 35, further comprising:

receiving image information associated with an object approaching at least one of the plurality of rotors;

processing the image information to determine a position and a trajectory of the object approaching at least one of the plurality of rotors; and adjusting the rotational speed of the at least one of the plurality of rotors such that the rotors do not dwell within the no-dwell zone, and to minimize damage to the rotors by the object.

40. A method of determining a plurality of rotational speed zones for a plurality of rotors coupled to an airframe of a multi-rotor vehicle, the method comprising:

determining a plurality of rotational speeds associated with one or more frequency aspects of the airframe;

determining a first zone of rotational speeds associated with frequencies less than one or more frequency aspects of the airframe;

determining a transitional zone of rotational speeds associated with frequencies substantially equivalent to one or more frequency aspects of the airframe; and determining a second zone of rotational speeds associated with frequencies greater than the one or more frequency aspects of the airframe.

* * * * *